US012762084B2

(12) United States Patent
Focht et al.

(10) Patent No.: US 12,762,084 B2
(45) Date of Patent: Oct. 13, 2026

(54) METHODS AND APPARATUS TO IMPLEMENT VECTOR PROCESSING UNITS

(71) Applicant: Openchip & Software Technologies S.L., Barcelona (ES)

(72) Inventors: Erich Ludwig Focht, Stuttgart (DE); Francesc Guim Bernat, Barcelona (ES); Violante Moschiano, Avezzano (IT); Satoru Tagaya, Barcelona (ES)

(73) Assignee: Openchip & Software Technologies S.L., Barcelona (ES)

( * ) Notice: Subject to any disclaimer, the term of this patent is extended or adjusted under 35 U.S.C. 154(b) by 77 days.

(21) Appl. No.: 19/043,151

(22) Filed: Jan. 31, 2025

(65) Prior Publication Data

US 2026/0203252 A1 Jul. 16, 2026

Related U.S. Application Data

(63) Continuation of application No. PCT/EP2025/050564, filed on Jan. 10, 2025.

(30) Foreign Application Priority Data

Jan. 10, 2025 (WO) ................. PCT/EP2025/050564

(51) Int. Cl.
*G06F 9/38* (2018.01)
*G06F 9/32* (2018.01)
*G06F 15/80* (2006.01)

(52) U.S. Cl.
CPC ............ *G06F 15/8084* (2013.01); *G06F 9/32* (2013.01); *G06F 9/3836* (2013.01)

(58) Field of Classification Search
None
See application file for complete search history.

(56) References Cited

U.S. PATENT DOCUMENTS

2015/0135182 A1 5/2015 Liland et al.
2019/0294439 A1 9/2019 Ostby
2020/0394495 A1 * 12/2020 Moudgill ................. G06F 9/30
2023/0315479 A1 10/2023 Thuerck
2023/0359584 A1 11/2023 Abts et al.

OTHER PUBLICATIONS

International Searching Authority, "International Search Report," issued in connection with International Patent Application No. PCT/EP2025/050564, mailed on Aug. 7, 2025, 16 pages.
IPSJ Computer Museum, "Historical Computers in Japan Supercomputers NEC SX-1, SX-2," available at https://museum.ipsj.or.jp/en/computer/super/0008.html, retrieved Jan. 29, 2025, 2 pages.

* cited by examiner

*Primary Examiner* — Scott C Sun
(74) *Attorney, Agent, or Firm* — Hanley, Flight & Zimmerman, LLC

(57) ABSTRACT

Systems, apparatus, articles of manufacture, and methods are disclosed. An example vector processing unit (VPU) comprises: a plurality of vector lanes, the vector lanes able to collectively process an instruction of a first length, and sequencer circuitry to: distribute a second instruction to a first subset of the vector lanes, the second instruction having a second length shorter than the first length, and distribute a third instruction to a second subset of the vector lanes, the second subset to execute the third instruction in parallel with the execution of the second instruction by the first subset of vector lanes.

20 Claims, 21 Drawing Sheets

412

CSR ARRAY

| | CSR 504 | ENABLE 506 | LANE MASK 508 |
|---|---|---|---|
| 502A | ...VL... | 1 | 11111111 |
| 502B | ...VL... | 1 | 00001111 |
| 502C | ...VL... | 1 | 00110000 |
| 502D | ...VL... | 1 | 11000000 |
| 502E | ... | 0 | 00000000 |
| 502F | ... | 0 | 00000000 |
| 502G | ... | 0 | 00000000 |
| 502H | ... | 0 | 00000000 |
| 502I | ... | 0 | 00000000 |

FIG. 5

USER SPACE PSEUDOCODE 700

```
702A
PROGRAM:
    {
704A   VECTOR_GROUP.CREATE() = VG_A;
       VG_A.ASSIGN() = <LANE_A, LANE_B, LANE_C, LANE_D>;

704B   VECTOR_GROUP.CREATE() = VG_B;
       VG_B.ASSIGN() = <LANE_E, LANE_F>;

704C   VECTOR_GROUP.CREATE() = VG_C;
       VG_C.ASSIGN() = <LANE_G, LANE_H>;

706A   VG_A.EXECUTE() = (FUNCTION_A, ARGS_A);
       VG_B.EXECUTE() = (FUNCTION_B, ARGS_B);
       VG_C.EXECUTE() = (FUNCTION_A, ARGS_C);

    }

702B
PROGRAM:
    {
704D   VECTOR_GROUP.CREATE() = VG_D;
       VG_D.ASSIGN() = <LANE_A, LANE_E>;

704E   VECTOR_GROUP.CREATE() = VG_E;
       VG_E.ASSIGN() = <LANE_C, LANE_D>;

704F   VECTOR_GROUP.CREATE() = VG_F;
       VG_F.ASSIGN() = <LANE_B, LANE_F, LANE_G>;

704G   VECTOR_GROUP.CREATE() = VG_G;
       VG_G.ASSIGN() = <LANE_H>;

706B   VG_F.EXECUTE() = (FUNCTION_D, ARGS_F;
       VG_D.EXECUTE() = (FUNCTION_C, ARGS_D1);
       VG_E.EXECUTE() = (FUNCTION_C, ARGS_E);
       VG_G.EXECUTE() = (FUNCTION_E, ARGS_G);
       VG_D.EXECUTE() = (FUNCTIONCE, ARGS_D2);

    }
```

FIG. 7

LOW-LEVEL LANGUAGE INSTRUCTIONS (SENT TO SPU 106)

802

{
...
vconfig 1
vgset l1, v1 // $\mathbf{v_1}^1$ = lane1
vgset l2, v2 // $\mathbf{v_2}^1$ = lane2
vgset l3, v3 // $\mathbf{v_3}^1$ = lane3
vgset l4, v4 // $\mathbf{v_4}^1$ = lane4
vconfig 2
vgset l5, v1 // $\mathbf{v_1}^2$ = lane5
vgset l6, v2 // $\mathbf{v_2}^2$ = lane6
vconfig 3
vgset l7, v1 // $\mathbf{v_1}^3$ = lane7
vgset l8, v2 // $\mathbf{v_2}^2$ = lane8
...
}

804

{
...
vgctx 1
vld v2, (a3) // $\mathbf{v_2}^1$ <-- (a3)
vld v3, (a4) // $\mathbf{v_3}^1$ <-- (a4)
vadd v3,v2,v3 // $\mathbf{v_3}^1$ <-- $v_2^1 + v_3^1$
vgctx 2
vfmv v2,fa5 // $\mathbf{v_2}^2$ <-- fa5
...
}

FIG. 8A

METHODS AND APPARATUS TO IMPLEMENT VECTOR PROCESSING UNITS

RELATED APPLICATION

This patent arises from a continuation of International Application No. PCT/EP2025/050564, which was filed on Jan. 10, 2025. International Application No. PCT/EP2025/050564 is hereby incorporated herein by reference in its entirety. Priority to International Application No. PCT/EP2025/050564 is hereby claimed.)

FIELD OF THE DISCLOSURE

This disclosure relates generally to accelerators and, more particularly, to method and apparatus to virtualize vector processing units.

BACKGROUND

In recent years, computations workloads have become increasingly reliant on large amounts of parallel operations. A Vector Processing Unit (VPU) is a type of programmable circuitry that supports parallelism with Single Instruction, Multiple Data (SIMD) processing. VPUs can increase the efficiency of executing certain applications (e.g., training or executing machine learning models, graphics rendering for media or video games, etc.) compared to other types of programmable circuitry.

BRIEF DESCRIPTION OF THE DRAWINGS

FIG. 5 is an example implementation of the Configuration Status Register (CSR) array of FIG. 4A.

FIG. 7 is an example implementation of pseudocode generated by the software application, an operating system, or the hypervisor of FIG. 1.

FIG. 8A is an example implementation of instructions that are written in a low-level language and sent to the SPU of FIGS. 1 and 2.

In general, the same reference numbers will be used throughout the drawing(s) and accompanying written description to refer to the same or like parts. The figures are not necessarily to scale.

DETAILED DESCRIPTION

Figure 1:
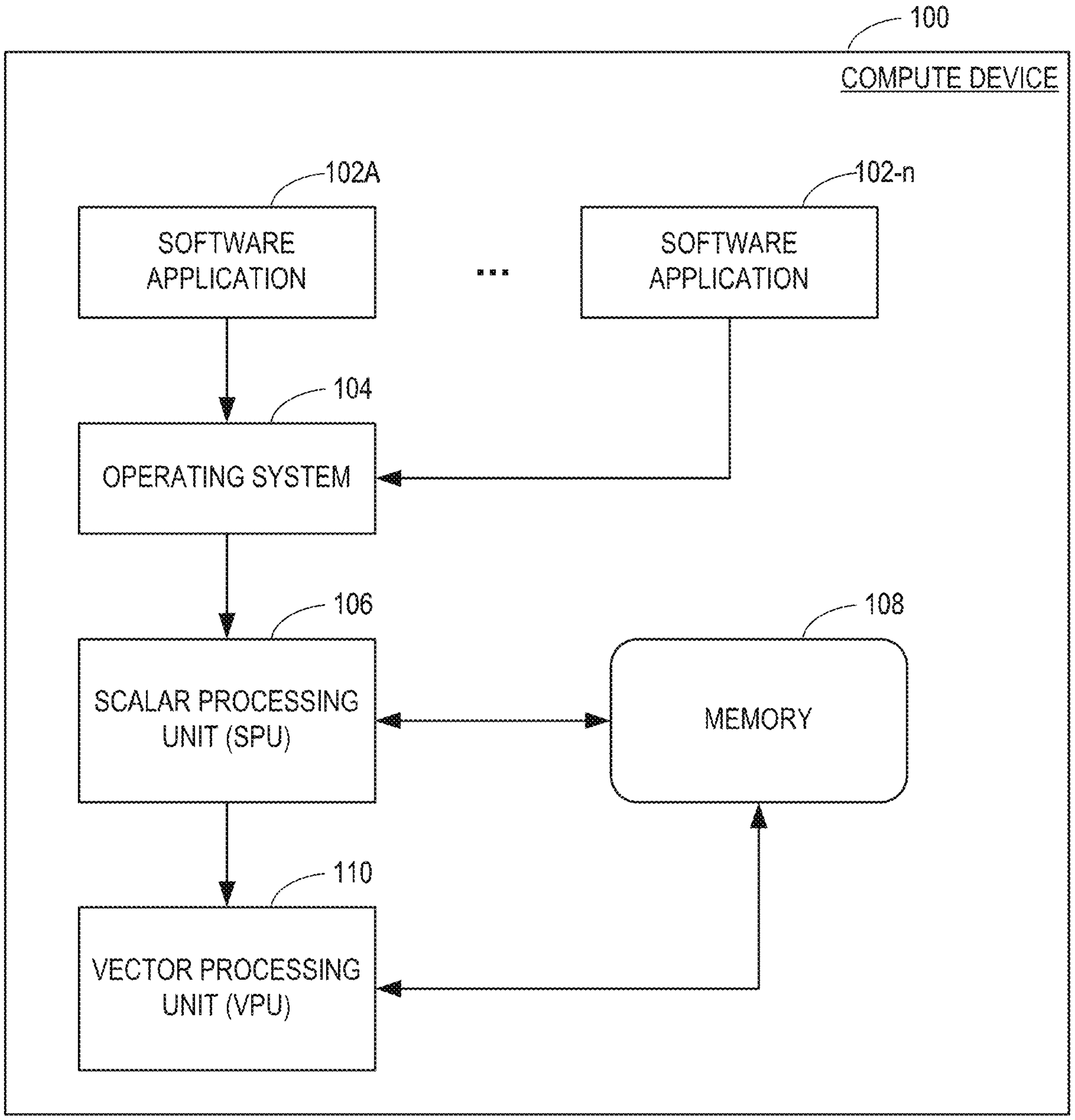
FIG. 1 is a block diagram of a first example compute device.

Processor circuitry (e.g., Scalar Processing Units (SPU), VPU, etc.) perform operations based on an Instruction Set Architecture (ISA). An ISA generally refers to rules that describe how a particular form of processor circuitry performs operations. For example, an ISA may define the types of machine-readable instructions, the maximum length of a machine-readable instruction, and the format of machine-readable instructions, which are supported by the processor circuitry. The processor circuitry can therefore execute any instructions written in a high-level programming language that, when compiled, conforms to instructions in a low-level programmable language that comply with the rules set by the ISA.

ISAs supporting VPUs include instruction types that are specific to the operation of a VPU. For example, a VPU-supported ISA specifies a fixed number of vector registers (VREGs). VREGs are portions of memory that store data operated on by vector execution units. Generally, a VPU-supported ISA also specifies the maximum vector length supported by the VPU and what type of operations the vector units can perform on VREG data. As used above and herein, vector length refers to the amount of data in a VREG that is consumed or processed in a vector instruction. The maximum vector length supported by a VPU is therefore dependent on the size of the VREGs. In some examples, the maximum vector length is fixed within the ISA. In other examples, the maximum vector length can be detected at runtime by an instruction or by reading a configuration register.

Known ISAs that support VPUs with multiple vector lanes require that all the vector lanes execute operations in sync with one another, where each vector lane processes its own portion of VREG data independently. Each vector lane includes its own execution units (e.g., adder circuitry, multiplier circuitry, etc.). The execution units are generally pipelined within the vector lane so that a given operation is split into a number (P) of small and simple sequential stages. When data is fed sequentially into the pipeline, the simplicity of each of the P stages allows for overlapping execution of the stages. Sequential data input also allows for increased throughput because the pipeline is processing P operations at once. Furthermore, the smaller and simpler stages allow for reduced clock cycle time.

While synchronous use of vector lanes allows known VPUs to efficiently execute instructions with large amounts of parallelism, the performance of known VPUs decreases when executing instructions with comparatively less parallelism. For example, consider a VPU that has M vector lanes, where each vector lane circuit can process a maximum of N-bytes of data per instruction at a rate of one byte per clock cycle. Such a VPU processes a total of M*N bytes of data in N clock cycles. Thus, a VPU can operate at maximum efficiency by executing a first instruction that requires all M*N bytes (e.g., the maximum vector length of the VPU) to operate. The latency of the execution unit consists of a constant number of cycles (S) needed to start the operation on the execution unit. An additional P cycles are required for the first M operands to pass in sync through the stages of the M pipelines. N more operands follow into each of the M vector lanes. If only one such instruction was issued, then all stages of the pipelined vector lanes run during N−P cycles. To keep the pipeline stages fully utilized, a subsequent instruction must be issued within N cycles from starting the first instruction.

Suppose further that the known VPU receives a second instruction that only distributes (N−3) bytes of data to each of the M vector lanes because it has less parallelism (and therefore a shorter vector length) than the first instruction. Here, the S+P cycles are still needed to start the vector execution units and pass the second instruction through the pipeline. To keep the pipeline stages fully utilized, a subsequent instruction must be loaded into a vector register fragment and issued within (N−3) cycles from starting the second instruction. Thus, to maintain full pipeline utilization, the size of the issue window following the second instruction (N−3 cycles) is smaller than the size of the issue window following the first instruction (N cycles). The reduced size of the issue window reduces the probability that an appropriately sized instruction is available within the (N−3) cycle period. The known VPU is therefore less efficient when executing the second instruction compared to the first instruction. With subsequent long vector instructions the latency S+P becomes negligible because the issue window to keep the pipelines fully utilized is N cycles. With short vectors the latency becomes dominant because the issue window decreases in size, thereby leading to inefficient usage.

Instructions with short vector lengths are common. Such instructions appear in all types of use cases, including those that use instructions with long vector lengths disproportionately (e.g., machine learning algorithms, graphics rendering, etc.). Additionally, many applications are developed with the presumption that they will be executed on a general purpose processor (e.g., a CPU) that does not support parallelism to the same extent that a VPU does. Accordingly, these applications generally use instructions that would correspond to a short vector length (and therefore run inefficiently) on a known VPU. Thus, the synchronous use of all vector lanes in a known VPU frequently decreases performance due to instructions with short vector lengths.

Example methods, apparatus, and systems described herein implement a VPU whose performance is not dependent on vector length. Rather, an example VPU described herein uses an ISA that allows for the division of the vector lanes into groups. The vector lanes in a vector group act together as if they were a distinct VPU, but each vector group acts independently of the other vector groups as distinct vector units. In other words, a VPU having multiple vector lanes may be effectively partitioned in two or more groups of vector lanes where each group of vector lanes act as a small VPU (e.g., a VPU with fewer lanes than the overall VPU). In some examples, a user space program uses the ISA to a) define how the vector lanes are divided into vector groups and b) assign operations with different vector lengths to the various groups. In other examples, an operating system supports multi-threading by using the ISA to define vector groups so that there is one vector group per hardware thread. In other examples, a hypervisor supports virtualization by using the ISA to define vector groups so that there is one vector group per virtual machine. Accordingly, the example VPU can execute multiple instructions with short vector lengths in parallel with one another. The example VPU can also execute instructions with long vector lengths by splitting one long instruction into multiple shorter instruction, or by using a vector group that includes most or all of the vector lanes. Example VPUs described herein therefore exhibit increased performance compared to other approaches by organizing vector lanes into groups (e.g., subsets of lanes) to execute instructions of different vector lengths efficiently (e.g., without letting lanes idle).

The following introduces examples of computer hardware for VPU operations, applicable in processor architectures such as chiplet-based processors, System-on-chip (SoC) circuitry, System-in-Package (SiP) or System-on-Package (SoP) circuitry, and/or any other modular packaging implementations of processor circuitry.

As used herein, a bare metal OS refers to an OS that has access to the physical resources (e.g., hardware and/or firmware) of the compute device. In some examples, the bare metal OS corresponds to a host OS that executes on the compute device to provide applications with access to the physical resources of the compute device. In some examples, the bare metal OS is a physical OS that executes below a virtual OS on the compute device and that provides the virtual OS with access to the physical resources of the compute device.

As used herein, a chiplet refers to any integrated circuit (IC) that has a modular structure designed to have one or more specified functionalities and to be combinable with other chiplets on an interposer or other substrate in a package. Examples of chiplets are compute chiplets that include processor circuitry (e.g., one or more processor circuits, such as one or more cores, etc.) and supporting circuitry (e.g., local memory, etc.) to provide processor functionality (e.g., to execute a host OS, applications, etc.), memory chiplets that include memory accessible to one or more other chiplets, communication chiplets that include communication interfaces (e.g., input/output hubs, networks, etc.) to enable other chiplets to communicate with each other and/or to other devices external to the package, etc. Example multi-tier management architectures provide a flexible management architecture that is multi-tiered to enable management of chiplet-based compute devices that include various combinations of chiplets from various manufacturers. Chiplets are further described below in conjunction with FIGS. 17, 18A, and 18B.

As used herein, a tile refers to any IC that has a modular structure designed to have one or more specified functionalities and to be combinable with other tiles in a chiplet. For example, tiles can group one or more functional circuits into a single tile to implement a specified feature and/or group of features. Furthermore, tiles from different manufacturers can be combined into a given chiplet, and/or tiles can be replicated for inclusion in a given chiplet. Examples of tiles are compute tiles that include one or more processor circuits (e.g., cores) and supporting circuitry (e.g., local memory) to provide processor functionality (e.g., to execute a host OS, applications, etc.) in a chiplet, memory tiles that include memory accessible to one or more other tiles in the chiplet, memory controller tiles to control access to the memory tiles in the chiplets, etc.

Also, example multi-tier management architectures that include example management tiles and/or example management chiplets disclosed herein may leverage different forms and/or levels of trust. Such different forms and/or levels of trust are also referred to herein as trust attributes. Such trust attributes can be utilized individually or in different combinations to achieve one or more overall trust goals associated with management of and/or operation of a compute device such as a tile and/or a chiplet.

For example, management tiles and/or management chiplets disclosed herein may implement one or more trust attributes related to device security (e.g., also referred to as device security trust attributes) to verify the authenticity and/or integrity of one or more management tiles, one or more management chiplets and/or one or more other tiles and/or chiplets included in the compute device. Additionally or alternatively, example management tiles and/or management chiplets disclosed herein may implement one or more trust attributes related to client security (e.g., also referred to as client security trust attributes) to verify the authenticity and/or integrity of one or more client devices, one or more of applications, etc., that request access to one or more of tiles and/or one or more of chiplets of the compute device. Additionally or alternatively, example management tiles and/or management chiplets disclosed herein may implement one or more trust attributes related to privilege verification (e.g., also referred to as privilege verification trust attributes) to verify that a tile, chiplet, client, etc., has appropriate authorization to be granted access to one or more features, one or more capabilities, one or more application programing interfaces (APIs), etc., provided by the tiles and/or chiplets of the compute device (e.g., corresponding to an approved set of features, capabilities, APIs). Additionally or alternatively, example management tiles and/or management chiplets disclosed herein may implement one or more trust attributes related to capability verification (e.g., also referred to as capability verification trust attributes) to verify that one or more features, one or more capabilities, one or more APIs, etc., provided by the tiles and/or chiplets of the compute device meet one or more expected advertised features, one or more capabilities, one or more APIs, etc., for those tiles and/or chiplets.

In some examples, the trust attributes associated with example management tiles and/or management chiplets disclosed herein are output as values, such as one or more numeric values, one or more text values, etc., that can be evaluated through one or more operations (e.g., comparisons, concatenations, summations, differences, etc.). For example, two or more different trust attributes can be combined to develop an overall trust value or score for an entity such as compute device, processor circuitry, a tile and/or a chiplet. In some examples, the values of individual trust attributes and/or different combinations of trust attributes can be used to develop several composite trust value(s) or score(s) (e.g., at different hierarchical levels) for the compute device, the processor circuitry, the tile and/or the chiplet.

Given the different forms of trust attributes provided by example tiles and/or chiplets disclosed herein, one or more of such trust attributes may also be referred to using other terminology. For example, trust attributes may also refer to as competence attribute(s) and/or compliance attribute(s) that quantify the suitability of features, capabilities, APIs, etc., provided by the tiles and/or chiplets for a given task or set of tasks (e.g., such as the competence and/or compliance of an artificial intelligence model obtained by and/or executed by a given tile and/or chiplet). In some examples, one or more trust attributes may be referred to as integrity attribute(s), assurance attribute(s), validation/validity attribute(s), privacy attribute(s), reliability attribute(s), credibility attribute(s), safety attribute(s), explainability attribute(s), trustworthiness attribute(s), etc.

FIG. 1 is a block diagram of an example compute device 100. FIG. 1 shows the compute device 100 includes example software applications 102A, . . . , 102-*n* (referred to collectively as software applications 102), an example operating system 104, an example Scalar Processing Unit (SPU) 106, example memory 108, and an example Vector Processing Unit (VPU) 110. In other examples, (e.g., cloud computing) one or more of the components of FIG. 1 may be implemented on multiple different compute devices.

The software applications 102 are programs that cause performance of tasks on the compute device 100. The tasks may correspond to any use case and may support any amount of parallelization. In some examples, the software applications 102 are referred to as user space programs because they receive inputs from and/or provide outputs to users through interface circuitry such as a display, a keyboard, a mouse, etc. The compute device 100 may include any number of software applications 102. The software applications 102 cause performance of tasks by providing instructions to the operating system 104.

The operating system 104 manages the hardware resources of the compute device 100 to execute the instructions defined by the software applications 102. For example, the operating system 104 may amend, convert, reorder, or otherwise edit the instructions of the software applications 102 to generate a stream of instructions that are interpretable by the SPU 106 and VPU 110. Thus, the stream of instructions generated by the operating system 104 comply with the ISA that corresponds to the VPU 110. The operating system 104 also analyzes the data dependency of the instructions from the software applications 102 to schedule the stream of instructions in a manner that mitigates race conditions.

A given instruction in the stream of instructions is categorized as either a scalar instruction or a vector instruction as described further below. In some examples, the operating system 104 determines whether a given instruction is scalar or vector. In other examples, the software applications 102 designate which tasks correspond to scalar instructions and which tasks correspond to vector instructions. The operating system 104 provides the stream of instructions to the SPU 106.

The SPU 106 refers to programmable circuitry that implements Single Instruction, Single Data (SISD). The SPU may be implemented, for example, by a Central Processing Unit (CPU). The SPU 106 executes the scalar instructions received from the operating system 104 by reading data from the memory 108, performing operations on the data, and storing the results back in the memory 108. The SPU 106 also forwards the vector instructions received from the operating system 104 to the VPU 110. The SPU is described further in FIG. 3.

The memory 108 stores data used by the SPU 106 and VPU 110 to perform the tasks defined by the software applications 102. The memory 108 may be implemented as any type of memory. For example, the memory 108 may be a volatile memory or a non-volatile memory. The volatile memory may be implemented by Synchronous Dynamic Random Access Memory (SDRAM), Dynamic Random Access Memory (DRAM), and/or any other type of RAM device. The non-volatile memory may be implemented by flash memory and/or any other desired type of memory device.

The VPU 110 refers to programmable circuitry that implements SIMD processing in accordance with the teachings described herein. To do so, the VPU 110 uses one or more vector groups to perform operations described by the vector instructions. The VPU 110 also reads data from the memory 108 before the operations are performed and writes data to the memory 108 to store the results of the operations. Collectively, the operations performed by the VPU 110 and SPU 106 accomplish the tasks described by the software applications 102. The VPU 110 is described further in connection with FIGS. 4-6.

Figure 2:
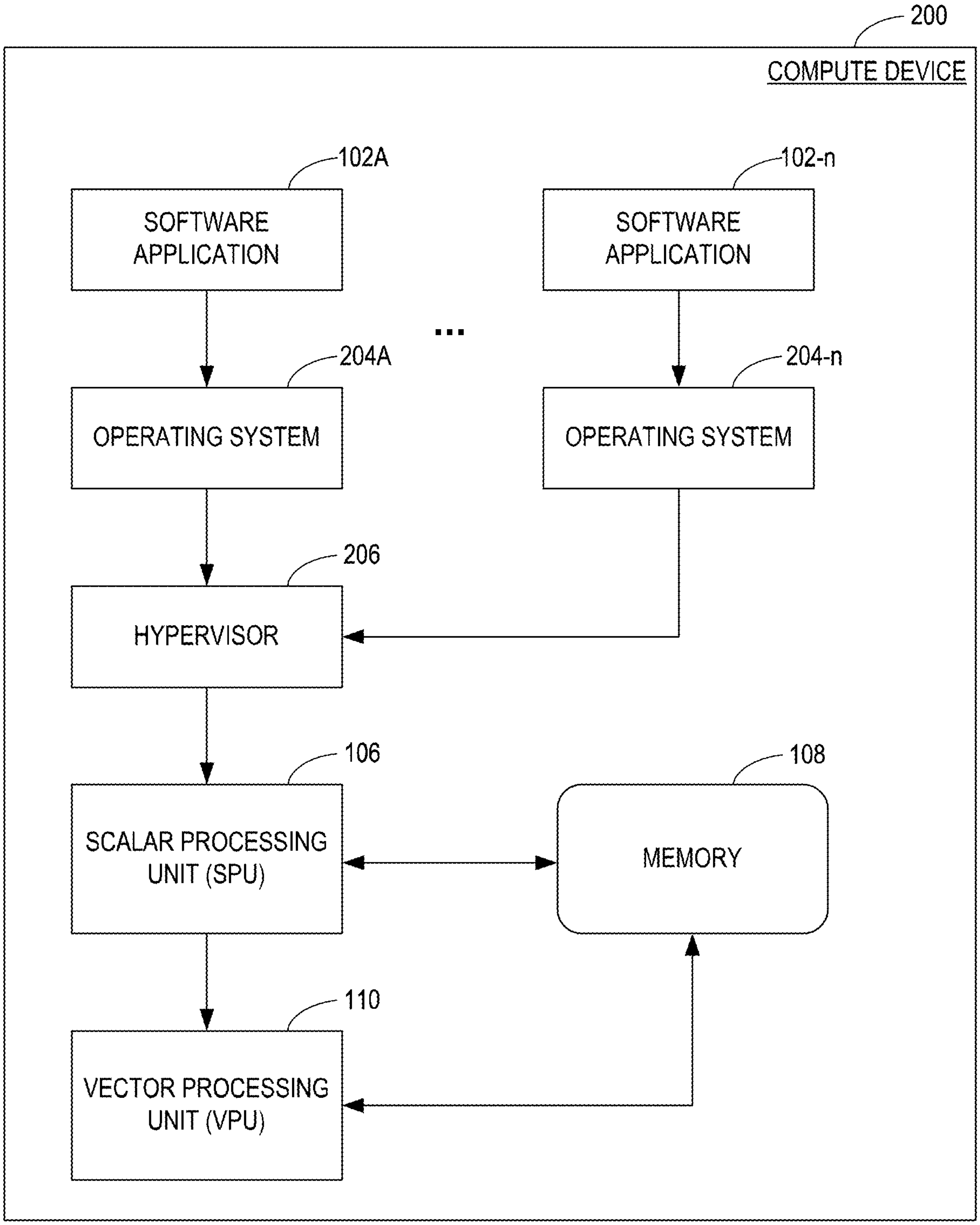
FIG. 2 is a block diagram of a second example compute device.

FIG. 2 is a block diagram of an example compute device 200. FIG. 2 shows the compute device 200 includes the software applications 102, the SPU 106, the memory 108, and the VPU 110 that operate as described above in connection with FIG. 1. The compute device 200 also includes example operating systems 204A, . . . , 204-*n* (collectively referred to as operating systems 204), and an example hypervisor 206. In other examples, (e.g., cloud computing) one or more of the components of FIG. 1 may be implemented on multiple different compute devices.

Like the operating system 104 of FIG. 1, the operating systems 204 of FIG. 2 receive instructions from the software applications 102. The example of FIG. 2 shows that a given operating system 204A receives instructions from one software application 102A. In other examples, a given operating system 204A may receive instructions from any number of software applications 102.

The operating systems 204 generate a stream of instructions meant for execution on the SPU 106 or the VPU 110. In FIG. 1, the operating system 104 generates an output stream of instructions with the knowledge that the operating system 104 has exclusive access to all of the hardware resources of the compute device 100. In contrast, the hardware resources of the compute device 200 must be shared by the multiple operating systems 204. Thus, the operating systems 204 provide their respective streams of instructions to the hypervisor 206 instead of providing the instructions directly to the SPU 106.

The hypervisor 206 combines, edits, and/or reorganizes the multiple outputs of the operating systems 204 into a single stream of ISA-compliant instructions. The hypervisor 206 then provides the single stream of instructions to the SPU 106. In doing so, the hypervisor 206 coordinates the usage of the SPU 106 and the VPU 110 such that each of the operating systems 204 operate in a separate and independent virtual machine. More generally, the hypervisor 206 may assign a given operating system to any kind of Virtual Execution Environment (VEE). Examples of VEEs include but are not limited to virtual machines, containers, etc. The hypervisor 206 and virtualization are described further in connection with FIG. 10.

Figure 3:
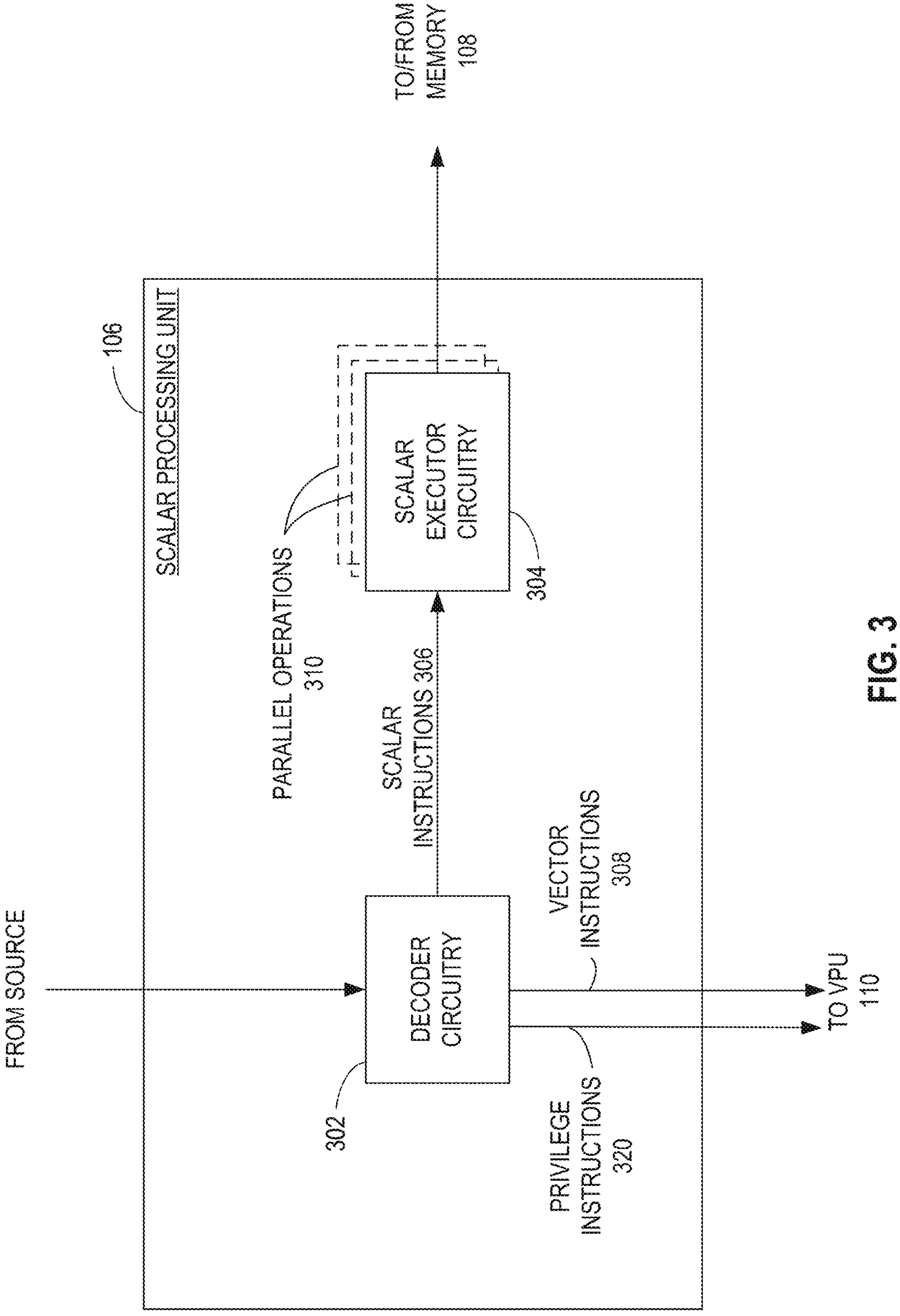
FIG. 3 is a block diagram of an example implementation of the scalar processing unit (SPU) of FIGS. 1 and 2.

FIG. 3 is a block diagram of an example implementation of the SPU 106 of FIGS. 1 and 2. FIG. 3 shows the SPU 106 includes example decoder circuitry 302 and example scalar executor circuitry 304. FIG. 3 also includes example scalar instructions 306, example vector instructions 308, example parallel operations 310, and example privilege instructions 320.

The decoder circuitry of FIG. 3 may be instantiated (e.g., creating an instance of, bring into being for any length of time, materialize, implement, etc.) by programmable circuitry such as a Central Processor Unit (CPU) executing first instructions. Additionally or alternatively, the decoder circuitry of FIG. 3 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 3 may, thus, be instantiated at the same or different times. Some or all of the circuitry of FIG. 3 may be instantiated, for example, in one or more threads executing concurrently on hardware and/or in series on hardware. Moreover, in some examples, some or all of the circuitry of FIG. 3 may be implemented by microprocessor circuitry executing instructions and/or FPGA circuitry performing operations to implement one or more virtual machines and/or containers.

The decoder circuitry 302 receives a stream of instructions from a source. The source is implemented as the operating system 104 in the example of FIG. 1 and is implemented as the hypervisor 206 in the example of FIG. 2. In some examples, a source of instructions additionally or alternatively refers to one or more of the software applications 102. The decoder circuitry 302 decodes the stream to determine which are scalar instructions 306 and which are vector instructions 308. The decoder circuitry 302 forwards the scalar instructions 306 to the scalar executor circuitry 304 and forwards the vector instructions 308 to the VPU 110. In some examples, the decoder circuitry 302 is instantiated by programmable circuitry executing decoder instructions and/or configured to perform operations such as those represented by the flowchart(s) of FIG. 10.

In some examples, the SPU 106 includes means for decoding scalar instructions. For example, the means for decoding may be implemented by decoder circuitry 302. In some examples, the decoder circuitry 302 may be instantiated by programmable circuitry such as the example programmable circuitry 1312 of FIG. 13. For instance, the decoder circuitry 302 may be instantiated by the example microprocessor 1400 of FIG. 14 executing machine executable instructions such as those implemented by at least blocks 1102, 1104, 1108, 1110 of FIG. 11. In some examples, the decoder circuitry 302 may be instantiated by hardware logic circuitry, which may be implemented by an ASIC, XPU, or the FPGA circuitry 1500 of FIG. 15 configured and/or structured to perform operations corresponding to the machine readable instructions. Additionally or alternatively, the decoder circuitry 302 may be instantiated by any other combination of hardware, software, and/or firmware. For example, the decoder circuitry 302 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The scalar executor circuitry 304 executes the scalar instructions 306. To do so, the scalar executor circuitry 304 reads data from the memory 108, performs operations on the data, and writes the results back to the memory 108. The scalar executor circuitry 304 may be implemented by any number of cores and any type of programmable circuitry that implements SISD processing. In some examples, the scalar executor circuitry 304 is instantiated by programmable circuitry executing scalar executor instructions and/or configured to perform operations such as those represented by the flowchart(s) of FIG. 11.

In some examples, the SPU 106 includes means for executing scalar instructions. For example, the means for executing scalar instructions may be implemented by scalar executor circuitry 304. In some examples, the scalar executor circuitry 304 may be instantiated by programmable circuitry such as the example programmable circuitry 1312 of FIG. 13. For instance, the scalar executor circuitry 304 may be instantiated by the example microprocessor 1400 of FIG. 14 executing machine executable instructions such as those implemented by at least blocks 1106 of FIG. 11. In some examples, the scalar executor circuitry 304 may be instantiated by hardware logic circuitry, which may be implemented by an ASIC, XPU, or the FPGA circuitry 1500 of FIG. 15 configured and/or structured to perform operations corresponding to the machine readable instructions. Additionally or alternatively, the scalar executor circuitry 304 may be instantiated by any other combination of hardware, software, and/or firmware. For example, the scalar executor circuitry 304 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the scalar executor circuitry 304 is functionally divided into multiple processor instances that perform SIMD operations concurrently and independently of one another. Such a functional division of the scalar executor circuitry 304 is represented in FIG. 2 as the parallel operations 310. In some examples, the operating system 104 of FIG. 1 supports multithreading by instructing the SPU 106 to perform parallel operations 310. As used herein, multithreading refers to the ability for the SPU 106 and VPU 110 to perform multiple independent threads of execution within a single process in parallel. Examples of multithreading technologies in industry include but are not limited to harts in the Reduced Instruction Set Computer Five (RISC-V) ISA, hyperthreads in Intel-defined ISAs, Simultaneous Multi-threading (SMT) on Advanced Micro Devices (AMD) ISAs, International Business Machines (IBM) Power, Multithreading Extension (MTE) on Advanced RISC Machine (ARM) ISAs, etc. In other examples, the hypervisor 206 of FIG. 2 instructs the SPU 106 to perform parallel operations 310 so that each functional instance of the scalar executor circuitry 304 corresponds to its own virtual machine.

When parallel operations 310 are performed, a given instruction for the scalar executor circuitry 304 to perform operations can only be executed by one functional instance of the scalar executor circuitry 304. As used above and herein, instructions that describe operations to be performed are referred to herein as operation instructions. To avoid a first portion of the scalar executor circuitry 304 from inadvertently performing operations that were meant for a second portion, the ISA of the SPU 106 expects that the source (e.g., the operating system 104 or the hypervisor 206) also provide instructions that describe which functional instance a given operation corresponds to. As described herein, an instruction that designates which functional instance of the scalar executor circuitry 304 is currently assigned to receive operation instructions is referred to as the SPU context. Accordingly, when the source of FIG. 3 provides an instruction that changes the SPU context, a component in the SPU 106 responsible for operation distribution stops providing operations to a first portion of the scalar executor circuitry 304 and begins providing operations to a second portion of the scalar executor circuitry 304.

The decoder circuitry 302 also sends privilege instructions 320 to the VPU 110. The privilege instructions 320 describe whether the scalar executor circuitry 304 is operating in privileged mode or unprivileged mode. When in unprivileged mode, the software applications 102 are forbidden from generating instructions that switch the VPU context or reconfigure it. In such examples, only the operating systems 104 or the hypervisor 206 are allowed to generate instructions that switch the VPU context. In contrast, user space programs such as the applications 102 are allowed to change the VPU context when the SPU 106 is in privileged mode. The VPU 110 interprets the vector instructions 308 based on the privilege instructions 320 as described further below.

Figure 4A:
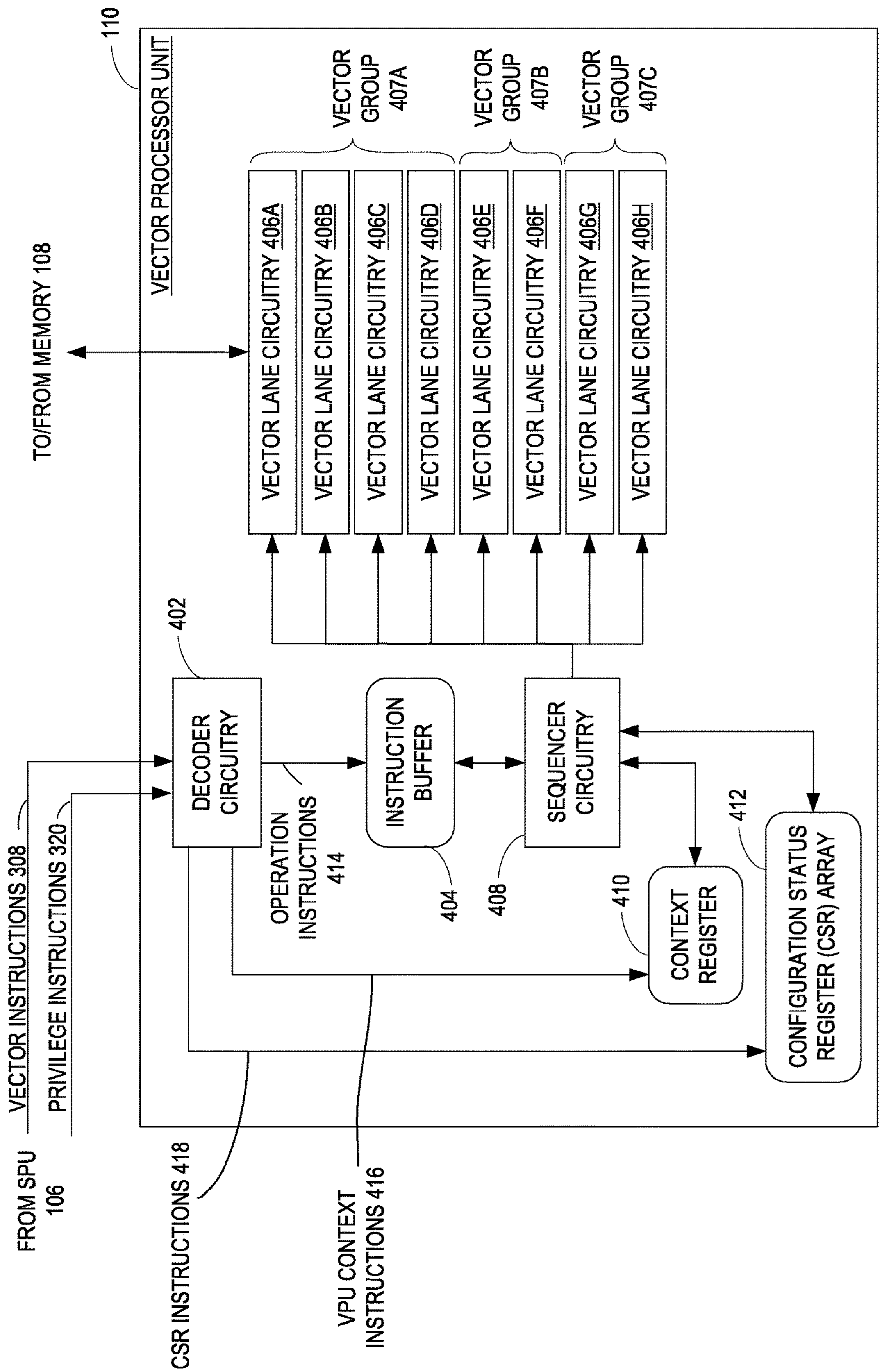
FIG. 4A is a block diagram of a first example implementation of the vector processing unit (VPU) of FIGS. 1 and 2.

FIG. 4A is a block diagram of a first example implementation of the VPU 110 of FIGS. 1 and 2. In the example of FIG. 4A, the VPU 110 includes example decoder circuitry 402, an example instruction buffer 404, example vector lane circuitry 406A, 406B, 406C, 406D, 406E, 406F, 406G, 406H (referred to collectively as vector lanes 406), example sequencer circuitry 408, an example context register 410, and an example configuration status register (CSR) array 412. FIG. 4A also includes the vector instructions 308 of FIG. 3, example operation instructions 414, example VPU context instructions 416, and example CSR instructions 418. In the example of FIG. 4A, the vector lanes 406 are organized into example vector groups 407A, 407B, 407C (referred to collectively as vector groups 407).

Figure 6:
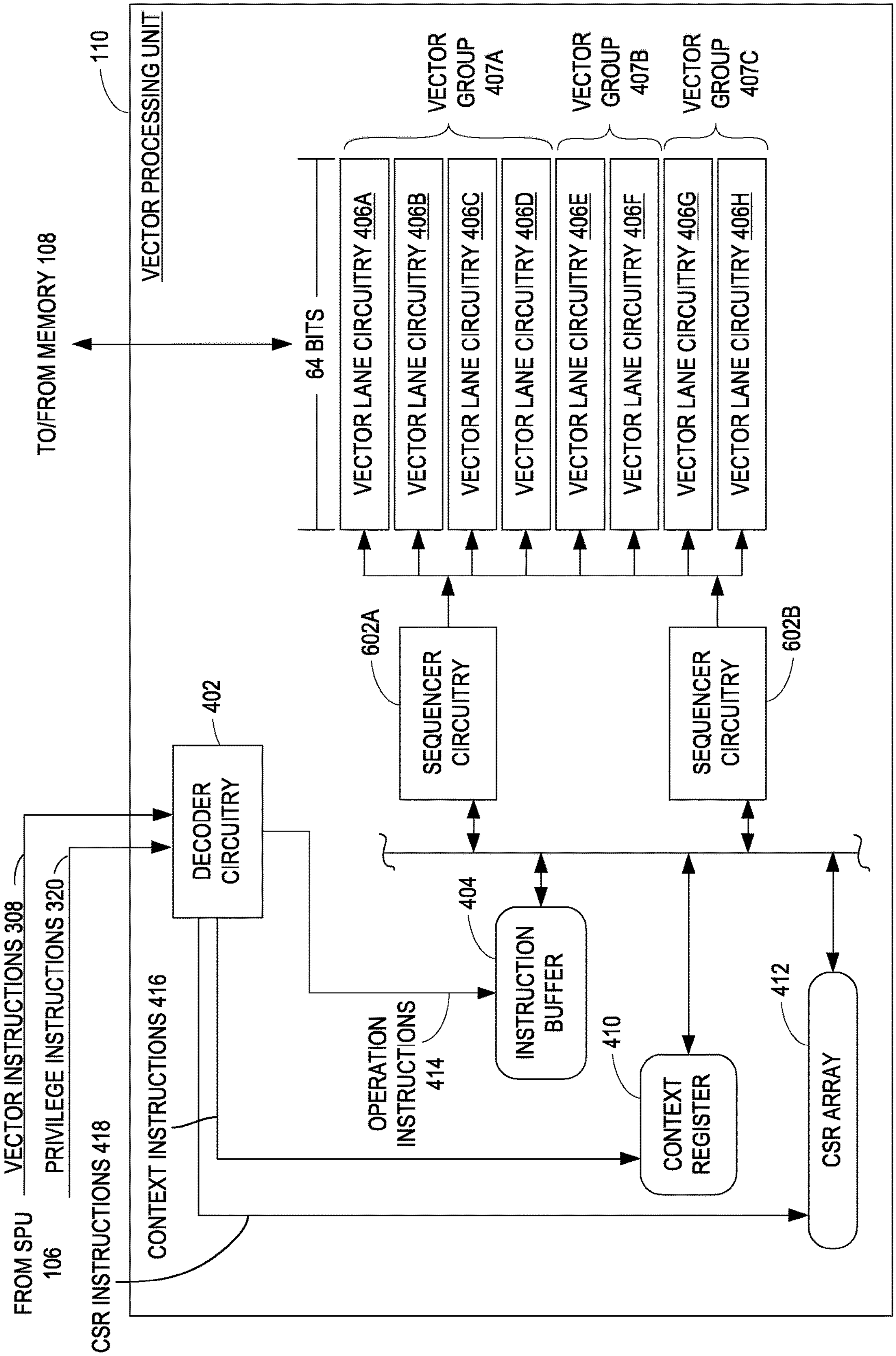
FIG. 6 is a block diagram of a second example implementation of the VPU of FIGS. 1 and 2.

The VPU 110 of FIGS. 4 and 6 may be instantiated (e.g., creating an instance of, bring into being for any length of time, materialize, implement, etc.) by programmable circuitry such as a Central Processor Unit (CPU) executing first instructions. Additionally or alternatively, the VPU 110 of FIGS. 4 and 6 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIGS. 4 and 6 may, thus, be instantiated at the same or different times. Some or all of the circuitry of FIGS. 4 and 6 may be instantiated, for example, in one or more threads executing concurrently on hardware and/or in series on hardware. Moreover, in some examples, some or all of the circuitry of FIGS. 4 and 6 may be implemented by microprocessor circuitry executing instructions and/or FPGA circuitry performing operations to implement one or more virtual machines and/or containers.

The decoder circuitry 402 decodes the stream of vector instructions 308 from the SPU 106 into one of the operation instructions 414, the VPU context instructions 416, or the CSR instructions 418. Just as the operation instructions within the scalar instructions 306 describe operations for the scalar executor circuitry 304 to perform, the operation instructions 414 within the vector instructions 308 describe operations for the vector lanes 406 to perform. The decoder circuitry 402 stores the operation instructions 414 in the instruction buffer 404 until the appropriate one or more of the vector lanes 406 are ready to perform the corresponding operations. In some examples, the decoder circuitry 402 is instantiated by programmable circuitry executing decoder instructions and/or configured to perform operations such as those represented by the flowchart(s) of FIG. 12.

In some examples, the VPU 110 includes means for decoding vector instructions. For example, the means for decoding vector instructing may be implemented by decoder circuitry 402. In some examples, the decoder circuitry 402 may be instantiated by programmable circuitry such as the example programmable circuitry 1312 of FIG. 13. For instance, the decoder circuitry 402 may be instantiated by the example microprocessor 1400 of FIG. 14 executing machine executable instructions such as those implemented by at least blocks 1202, 1203 of FIG. 12. In some examples, the decoder circuitry 402 may be instantiated by hardware logic circuitry, which may be implemented by an ASIC, XPU, or the FPGA circuitry 1500 of FIG. 15 configured and/or structured to perform operations corresponding to the machine readable instructions. Additionally or alternatively, the decoder circuitry 402 may be instantiated by any other combination of hardware, software, and/or firmware. For example, the decoder circuitry 402 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The vector lanes 406 performs operations in parallel with one another to execute the operation instructions 414. In the example of FIG. 4A, the vector lanes are organized into three vector groups 407A, 407B, and 407C and therefore can execute three independent operation instructions simultaneously. The vector lanes 406 use the vector groups 407 to execute instructions with comparatively short vector lengths more efficiently than known VPUs that force all vector lanes to work on the same instruction at any point in time. The vector lanes 406 and the vector groups 407 are described further in connection with FIG. 4B. In some examples, the vector lanes 406 are instantiated by programmable circuitry executing vector lane instructions and/or configured to perform operations such as those represented by the flowchart(s) of FIG. 12.

In some examples, the VPU 110 includes means for executing vector instructions. For example, the means for executing vector instructions may be implemented by vector lanes 406. In some examples, the vector lanes 406 may be instantiated by programmable circuitry such as the example programmable circuitry 1312 of FIG. 13. For instance, the vector lanes 406 may be instantiated by the example microprocessor 1400 of FIG. 14 executing machine executable instructions such as those implemented by at least blocks 1216 of FIG. 12. In some examples, the vector lanes 406 may be instantiated by hardware logic circuitry, which may be implemented by an ASIC, XPU, or the FPGA circuitry 1500 of FIG. 15 configured and/or structured to perform operations corresponding to the machine readable instructions. Additionally or alternatively, the vector lanes 406 may be instantiated by any other combination of hardware, software, and/or firmware. For example, the vector lanes 406 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

The software applications 102, the operating system 104, and/or the hypervisor 206 leverage the performance improvements of the vector groups 407 by providing the VPU 110 with instructions that comply with the ISA described in the teachings herein. For example, splitting the vector lanes 406 into vector groups 407 causes the vector lanes 406 to follow a similar organization as the scalar executor circuitry 304 when it performs parallel operations 310. Namely, an operation instruction within the instruction buffer 404 can only be executed by one of the vector groups 407. To avoid a first vector group 407A from inadvertently performing operations that were meant for a second vector group 407B, the ISA described herein expects that a source (e.g., the operating system 104 or the hypervisor 206) defines the VPU context by providing VPU context instructions 416 within the vector instructions 308. As used above and herein, the VPU context is a value that describes which of the vector groups 407A, 407B, 407C corresponds to a given vector operation instruction. Thus, the VPU context and the SPU context are two separate values that refer to separate functional groupings on separate hardware components. The VPU 110 stores the VPU context value in the context register 410. As used above and herein, the VPU context instructions 416 refer to instructions that cause the decoder circuitry 402 to change the VPU context by writing a new value to the context register 410.

A source generally changes the VPU context during run time (e.g., during the period when the vector lanes 406 are executing the operation instructions 414). At run time, the sequencer circuitry 408 determines which vector group should receive operation instructions 414 by reading the context register 410. When the source provides VPU context instructions 416, the sequencer circuitry 408 stops distributing operating instructions to a vector group (e.g., 407A) that was previously identified by the context register 410 and begins distributing operating instructions to a vector group (e.g., 407B) that is currently identified by the context register 410. Accordingly, before distributing a given operation instruction from the instruction buffer 404, the sequencer circuitry 408 is to reread the context register 410 to check whether the VPU context has changed. In some examples, the sequencer circuitry 408 is instantiated by programmable circuitry executing sequencer instructions and/or configured to perform operations such as those represented by the flowchart(s) of FIG. 12.

The ISA described in examples herein can place restrictions on which sources are allowed to use the VPU context instructions 416 to change the VPU context, respectively. The decoder circuitry 402 enforces any restrictions that may exist in a given use case by checking the status of the privilege instructions 320. In some examples, the SPU 106 raises an exception when encountering VPU context instructions 416 from user space programs in unprivileged mode so that the decoder circuitry 302 never forwards said instructions to the VPU 110.

The privilege instructions 320 may indicate a different status based on the particular use case. In multi-threading examples where the VPU 110 supports one hardware thread per vector group, the privilege instructions 320 stay in privilege mode such that only the operating system 104 can change the SPU context and the VPU context. Thus, the decoder circuitry 402 ignores any attempts by the software applications 102 to change the VPU context in a multi-threading example. Similarly, in virtualization examples where the VPU 110 supports one virtual machine per vector group, the privilege instructions 320 stay in privilege mode such that only the hypervisor 206 is allowed to define the VPU context. In some examples, the decoder circuitry 402 also ignores CSR instructions 418 from user space programs when the privilege instructions 320 indicate the SPU 106 is in unprivileged mode.

In some examples, the VPU 110 includes means for distributing vector instructions. For example, the means for distributing may be implemented by sequencer circuitry 408. In some examples, the sequencer circuitry 408 may be instantiated by programmable circuitry such as the example programmable circuitry 1312 of FIG. 13. For instance, the sequencer circuitry 408 may be instantiated by the example microprocessor 1400 of FIG. 14 executing machine executable instructions such as those implemented by at least blocks 1204-1214, 1218, 1220 of FIG. 12. In some examples, the sequencer circuitry 408 may be instantiated by hardware logic circuitry, which may be implemented by an ASIC, XPU, or the FPGA circuitry 1500 of FIG. 15 configured and/or structured to perform operations corresponding to the machine readable instructions. Additionally or alternatively, the sequencer circuitry 408 may be instantiated by any other combination of hardware, software, and/or firmware. For example, the sequencer circuitry 408 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) configured and/or structured to execute some or all of the machine readable instructions and/or to perform some or all of the operations corresponding to the machine readable instructions without executing software or firmware, but other structures are likewise appropriate.

In some examples, the VPU 110 supports multi-threading by executing one thread per vector group. The VPU 110 can therefore execute multiple threads of vector operation instructions in parallel. In other examples, the VPU 110 supports virtualization by executing operations for one virtual machine per group. The VPU 110 can therefore execute vector operation instructions for multiple virtual machines in parallel in such examples. Accordingly, the ISA described in the teachings described herein expects that whenever an operating system 104 supporting multi-threading wishes to indicate the nth set of operation instructions correspond to a different thread than the (n−1)th set of operations, the operating system 104 switch both the SPU context and the VPU context to indicate the shift to the new thread. Similarly, the ISA described in the teachings described herein expects that whenever the hypervisor 206 wishes to indicate the nth set of operation instructions correspond to a different virtual machine than the (n−1)th set of operations, the hypervisor 206 switch both the SPU context and the VPU context to indicate the shift to the new thread. In contrast, ISAs for known VPUs do not reflect the concept of a VPU context because all the vector lanes in a known VPU work together on the same instruction operation. Thus, a known VPU can only execute one thread or support one virtual machine at a time.

While the context register 410 informs the sequencer circuitry 408 of the VPU context (e.g., which vector group corresponds to a given operation instruction), the context register 410 does not inform the sequencer circuitry 408 which vector lanes 406 correspond to a given vector group. Accordingly, the ISA described herein expects that a source (e.g., the operating system 104, the hypervisor 206, etc.) include CSR instructions 418 within the vector instructions 308 before run time. The CSR instructions 418 define the number of vector groups 407 that exist for a particular run time and assign each of the vector lanes 406 to a specific vector group. Thus, the source can change the number of vector groups and/or change the assignment of one or more vector lanes before run time to improve the efficiency at which the vector lanes 406 execute one or more applications during run time.

Before run time, the decoder circuitry 402 populates the CSR array 412 based on the CSR instructions 418. The CSR array 412 is described further in connection with FIG. 5. During run time, the sequencer circuitry 408 reads the CSR array 412 to determine which subset of vector lanes corresponds to the VPU group identified in the context register 410. The sequencer circuitry 408 then distributes operation instructions 414 from the instruction buffer 404 to the foregoing subset of vector lanes until the VPU context changes.

Figure 4B:
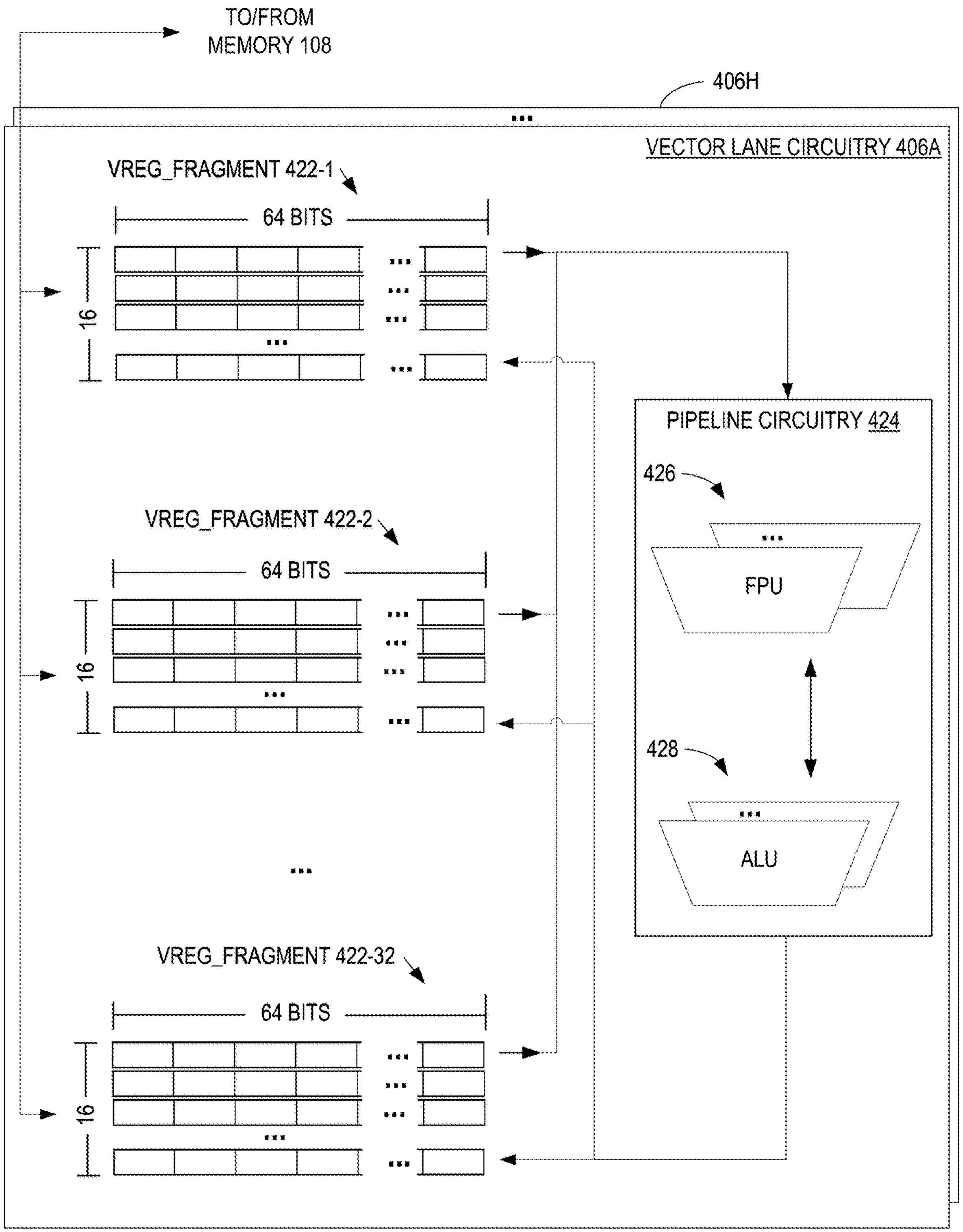
FIG. 4B is an example implementation of vector lane circuitry from the VPU 110 of FIG. 4A

FIG. 4B is an example implementation of vector lane circuitry from the VPU 110 of FIG. 4A. FIG. 4B shows the vector lane circuitry 406A includes example vector register (VREG) fragments 422-1, 422-2, . . . , 422-32 (collectively referred to as VREG fragments 422) and example pipeline circuitry 424. The pipeline circuitry 424 includes example Floating Point Operating Units (FPUs) 426 and example Arithmetic Logic Units (ALUs) 428. While FIG. 4B is described below with reference to the vector lane circuitry 406A, the vector lane circuitry 406B, . . . , 406H are also implemented with the same components as shown in FIG. 4B and operate as described below.

The VREG fragments 422 are portions of memory that act as a low-level cache for the pipeline circuitry 424. The VPU 110 loads data from a specific address in main memory 108 to a specific VREG fragment 422-1 based on vector load instructions that are forwarded from the SPU 106. Once a particular set of VREG fragments (e.g. 422-1 and 422-2) are fully loaded with data from the memory 108 that corresponds to a given operation instruction 414, the pipeline circuitry 424 can implement said operation instruction 414 by reading the VREG fragments 422-1 and 422-2, performing operations on the data, and writing data to a VREG fragment (e.g., 422-4).

ISAs define the total number of VREGs that exist within the VPU. ISAs also expect the vector lanes 406 to contain enough memory to support the defined VREGs. In the example of FIG. 4B, the ISA defines 32 VREGs. Each of the 32 VREGs has one fragment in each of the vector lanes 406 as shown in FIG. 4B. In other examples, the ISA defines a different number of VREGs that are fragmented evenly across the vector lanes 406.

Each of the vector lanes 406 includes its own FPUs 426 and ALUs 428 in a given vector lane circuitry 406A to perform operations independently of the other vector lane circuitry 406B, 406C, . . . 406H. In contrast, all vector lanes in known VPUs work together synchronously and therefore share a single set of FPUs and ALUs. Within a given vector lane circuitry 426A, the FPUs 426 and the ALUs 428 operate together in stages to form a given pipeline. In the example of FIG. 4B, each of the stages in the pipeline circuitry 424 perform operations on values that are 64-bits in length. As a first example, suppose VREG fragments 422-1 and 422-2 are fully loaded with data and an operation instruction 414 calls for the pipeline circuitry 424 to add the values stored in the two register fragments. In the first clock cycle of such an example, the first stage of the pipeline circuitry 424 performs operations on the first rows of data from the VREG fragments 422-1 and 422-2 because each row is 64 bits long. In the second clock cycle, the second stage of the pipeline circuitry performs operations on the results of the operations performed by the first stage in the first clock cycle. The first stage also operates on the second rows of data from the VREG fragments 422-1 and 422-2 during the second clock cycle. The vector lane circuitry 406A continues passing data to the next stage of the pipeline and continues loading data from the next row of the VREG fragments into the first stage for 16 clock cycles. After the 16th clock cycle of this example, all the rows in the VREG fragments 422-1 and 422-2 have been processed. To keep the pipeline circuitry 424 at full utilization, the vector lane circuitry 406A must begin executing a new operation instruction on the $17^{th}$ clock cycle by loading the first stage of the pipeline with data from a different VREG fragment 422-3. In turn, the VREG fragment 422-3 must also be loaded with data from the memory 108 corresponding to the new operation instruction by the $17^{th}$ clock cycle. Thus, in the example of FIG. 4B, the issue window as described above is 16 clock cycles. Furthermore, the maximum fragment length in the example of FIG. 4B is 16*64 bits=1024 bits.

As a second example, suppose the VREG fragments 422-1 and 422-2 had only been loaded with ten 64-bit values instead of 16 and thus had a shorter vector length of 10*64=640 bits. In this second example, to keep the pipeline fully utilized, the vector lane circuitry 406A has only ten cycles to load VREG-fragment 422-3 with the data corresponding to the new operation instruction. In contrast, in the foregoing first example, the vector lane circuitry 406A had 16 clock cycles to load the same data. This different sized issue window means the pipeline circuitry 424 is more likely to idle for some clock cycles while waiting for the VREG fragment 422-3 to finish loading in the second example than it is in the first example. Thus, the efficiency of the pipeline circuitry 424 (and the VPU 110 as a whole) is maintained by filling the VREG fragments 422 with the full set (16) of 64-bit values as much as possible and maintaining a maximum-sized issue window.

Advantageously, the use of the vector lanes 407 described herein increases the efficiency of executing instructions with comparatively short vector lengths. In the example of FIG. 4A, the VPU 110 implements eight vector lanes 406 that each have a maximum fragment length of 1024 bits as described above. Thus, in this example, the maximum vector length of the VPU 110 is therefore 8*1024=8192 bits. Furthermore, an instruction with a vector length of 4096 bits (e.g., 64 values that are each 64-bits long) has a comparatively short vector length because it is half of the maximum vector length. Known VPUs require all vector lanes work together on one instruction at a time. Thus, a known VPU with the dimensions shown in FIGS. 4A and 4B would load data corresponding to a 4096 bit instruction to all eight vector lanes, where each vector lane has a VREG fragment that has only eight 64-bit values (8*8*64=4096). Accordingly, a known VPU that executes an instruction with a vector length of 4096 bits has a corresponding issue window of only eight clock cycles to keep its pipeline fully utilized. In contrast, the VPU 110 described herein can assign the 4096 bit instruction to the vector group 407A (e.g., only four of the eight total vector lanes 406). Thus, each of the four vector lanes has a VREG fragment 422-1 that stores the maximum amount of data: sixteen 64-bit values (4*16*64=4096). Accordingly, the VPU 110 executes the instruction with vector length 4096 with an issue window of sixteen clock cycles. Thus, for the same 4096 bit instruction, the VPU 110 has a larger issue window, is more likely to keep its pipeline fully utilized, and runs more efficiently than the known VPU. Furthermore, the vector groups 407B and 407C can also execute second and third operation instructions while the vector group 407A executes the 4096 bit instruction. In other examples, the VPU 110 implements a different number of vector lanes 406, supports a different maximum fragment length per vector lane, and/or has a different maximum vector length.

The VPU 110 operates the vector lanes 406 in vector groups 407 in accordance with the teachings of this disclosure. In the example of FIG. 4A, the vector group 407A corresponds to vector lanes 406A-406D, the vector group 407B corresponds to vector lanes 406E and 406F, and the vector group 407C corresponds to vector lanes 406G and 406H. Accordingly, the vector groups 407 have asymmetric sizes in FIG. 4A. The vector lanes within a given vector group act as a distinct VPU by operating in sync to execute an operation instruction from the instruction buffer 404. Thus, in the example of FIG. 4A, the maximum vector length of an instruction sent to the vector group 407A is 4*1024=4096 bits, the vector group 407B has a maximum vector length of 2048 bits, and the vector group 407C has a maximum vector length of 2048 bits. Advantageously, the vector groups 407 operate independently and concurrently with one another. Accordingly, in the example of FIG. 4A, the VPU 110 can simultaneously execute a first operation instruction having a vector length of 4096 bits, a second operation instruction having a vector length of 2048 bits, and a third operation instruction having a vector length of 2048 bits as described above. With maximum sized vectors, each of the operations in each of the vector groups runs for at least 16 cycles as described above.

More generally, the n vector lanes present in an example VPU described herein may be organized into any number of differently sized vector groups so long as the vector group definitions form mutually exclusive subsets of the vector lanes 406. As the number and size of vector groups change, the maximum vector lengths supported by the example VPU also change. For example, the eight vector lanes 406 having a collective vector length of 8192 bits in the VPU 110 can be organized as shown in FIG. 4A (with one vector group having four vector lanes and two vector groups having two lanes each), and can have two vector groups of four vector lanes each with a maximum vector length of 4096 bits, and can have four vector groups of two lanes each with a maximum vector length of 2048 bits, and can have other configurations with asymmetric vector group sizes, etc. Thus, the VPU 110 only supports ISAs that allow implementations with different maximum vector length. Examples of such ISAs found in industry include but are not limited to (ARM) Scalable Vector Extension (SVE) and the RISC-V Vector extension.

In contrast to the dynamic vector groupings described above, known VPUs require all vector lanes to operate in sync to execute a single operation instruction. Thus, at any point in time, known VPU with the same dimensions as the example VPU 110 (eight vector lanes corresponding 64 bits each) can only have eight vector lanes execute in parallel to implement a single instruction. In contrast, at any point in time, the VPU 110 as shown in FIG. 4A can have four vector lanes 406A-406D execute in parallel to implement a first instruction, and have two vector lanes 406E and 406F execute in parallel to implement a second instruction, and have another two vector lanes 406G and 406H execute in parallel to implement a third instruction. More generally, the ability of the VPU 110 to split the split the vector lanes 406 into vector groups 407 enables the VPU 110 to perform operation instructions with comparatively small vector lengths more efficiently than known VPUs.

The increased efficiency of vector groups can also be expressed algebraically. In general, the performance of the vector lanes 406 when implementing a functional loop of is given by equation (1):

$$Perf(n) = (ops \cdot n)/(s + [n/p]T) \tag{1}$$

In equation (1), n refers to the number of iterations in the loop, ops refers to the number of operations in one iteration of the loop, s is the startup time of the pipeline (e.g., the time it takes to fetch, decode, and execute the first operation instruction), p is the level of parallelism (which is dependent on the size of the vector groups), and Tis the time for a single iteration. Perf(n) is therefore expressed as a number of operations per unit of time. As n approaches infinity, the performance of the vector lanes 406 reaches an asymptotic limit. The maximum performance achieved at this limit is expressed in equation (2):

$$Perf(n \to \infty) = P_{max} = (ops \cdot p)/T \tag{2}$$

Similarly, $n_{1/2}$, the number of loop iterations required to reach half of the maximum performance $P_{max/2}$ and satisfy $Perf(n_{1/2})=P_{max}/2$, is given by equation (3):

$$n_{1/2} = (s \cdot p)/T \tag{3}$$

A small value of $n_{1/2}$ means that the vector lanes 406 require only a small number loops before executing at a performance of $P_{max/2}$. Accordingly, decreasing the size of the vector groups 407 (and thereby decreasing the value of p) proportionally decreases $n_{1/2}$ and improves the performance of the VPU 110. For example, presuming the vector dimensions are the same, a known VPU where all vector lanes are forced to work in sync exhibits the same performance of the VPU 110 if all the vector lanes 406 were assigned to a single vector group. The level of parallelism in such a configuration is represented in the foregoing equations as p. The performance of a known VPU with parallelism of p and $n_{1/2}$ loop iterations is given by equation (4):

$$Perf_p(n_{1/2}) = P_{max}/2 = (ops \cdot p)/2T \tag{4}$$

In contrast, presume the example VPU 110 has the same number of vector lanes as the known VPU, but uses two vector groups that both have half of the vector lanes. The level of parallelism in such a configuration is represented in the foregoing equations as p/2. The performance of an example VPU described herein with parallelism of p/2 and $n_{1/2}$ loop iterations is given by equation (5):

$$Perf_{p/2}(n_{1/2}) = \frac{(ops \cdot s \cdot p)/2T}{s + (s \cdot p/T)(2/p)T} = \frac{(ops \cdot p)}{3T} = \frac{P_{max}}{3} \tag{5}$$

That is, while the known VPU achieves a performance of $(\frac{1}{2})P_{max}$ after $n_{1/2}$ loop iterations, the two vector groups in the VPU 110 collectively achieve a performance of $(\frac{2}{3})P_{max}$ (and therefore perform more operations per unit of time) after the same number of loop iterations. Similarly, if the VPU 110 had instead used four vector groups that each had a quarter of the total number vector lanes, the performance of the VPU 110 reaches $(\frac{4}{5})P_{max}$ at $n_{1/2}$ loop iterations. Accordingly, the splitting the vector lanes 406 into vector groups 407 increases the performance and efficiency of the VPU 110 at small loop iteration sizes.

FIG. 5 is an illustrative example of the CSR array 412 of FIG. 4. The example of FIG. 5, the CSR array 412 has rows 502A, 502B, 502C, 502D, 502E, 502F, 502G, 502H, 502I (collectively referred to as rows 502). A given row 502A has an example CSR 504A, an enable bit 506A, and a lane mask 508A.

In general, a VPU described herein with x vector lanes has a CSR array composed of (x+1) of the rows 502. In the example of FIG. 4A, the vector 110 has eight vector lanes 406. Accordingly, the example of FIG. 5 includes nine of the rows 502. The enable bits 506 in the rows 502B-502I describe which of the rows 502B-502I define a vector group. In the example of FIG. 5, the rows 502B, 502C, and 502D each define a vector group because enable bits 506B, 506C, and 506D are each set to 1. In this example, row 502B defines vector group 407A of FIG. 4A, row 502C defines vector group 407B, and row 502D defines vector group 407C.

Similarly, the rows 502E-502I do not define a vector group because enable bits 506E-506I are set to 0. Because the rows 502E-502I are not in use in FIG. 5, the CSRs 504E-504I remain empty and the lane masks 508E-508 do not identify any of the vector lanes 406.

In the rows 502B-502D that define vector groups, the lane masks 508 include '1' bits to indicate when a given vector lane does belong to a vector group and includes a '0' bits to indicate when a given vector lane does not belong to the vector group. For example, the lane mask 508B has a value of '00001111' to indicate the first four vector lanes of the VPU 110 (e.g., vector lanes 406A-406D) correspond to vector group 407A. Similarly, the lane mask 508C has a value of '00110000' to indicate vector lanes 406E and 406F correspond to vector group 408A, and the lane mask 508D has a value of '11000000' to indicate vector lanes 406G and 406H. Notably, the CSR array 412 holds data for eight vector group definitions in case a source assigns each vector lane 406A-406H to its own vector group.

Each row 502B-502D that define also have populated CSRs 504B, 504C, 504D. vector lanes A populated CSR 504B may contain any data that describes the configuration of the vector group and/or the current status of the vector group data. Such information includes but is not limited to the maximum vector length supported by the vector group, whether the vector group has a status of busy or free, etc. As used above and herein, a vector group is referred to as busy whenever it is actively executing an operation instruction. Similarly, a vector group is referred to as free whenever it is not actively executing an operation instruction. In contrast to the CSR array 412 that has one populated CSR per vector group, known VPUs use only a single CSR because all vector lanes work together synchronously.

While the last n rows of an example CSR array define up to n different vector groups, the first row in the CSR array 412 describes a configuration in which the vector lanes 406 are not split into vector groups. Rather, the row 502A describes a use case where all of the vector lanes 406 work together synchronously to implement one operation instruction at a time. Accordingly, all of the bits in the lane mask 508A are set to a '1' bit. The row 502A represents a default configuration in that, if none of the rows 502B-502I store vector group definitions or if the vector group definitions are invalid, the sequencer circuitry 408 will use the data in row 502A to distribute all operation instructions one at a time to all vector lanes 406. Accordingly, the enable bit 506A is set to a '1' bit, and the ISA described in the teachings herein prevents any source (e.g., the operating system 104 or the hypervisor 206) from editing data within the row 502A. Through the default configuration, the vector lanes 406 are able to collectively execute instructions with comparatively long vector lengths.

The ISA described in the teachings herein does explain how a source can use CSR instructions 418 to read and change the vector group definitions in the CSR array 412. For example, the ISA may support an instruction 'vgsz t0' that causes the VPU 110 to write the current number of vector group definitions in the CSR array 412 to the register t0. Similarly, the VPU context instructions 416 may include an instruction 'vgst <I>, <MSK>' that causes the VPU 110 to access the row in the CSR 412 having index <I>, change the lane mask in the row to <MSK>, and change the enable bit in the row to 1. In this example, the ISA described herein supports the variables <I> and <MSK> being implemented as either immediate values or scalar registers containing the desired values. For the reasons described above, any instruction that uses the 'vgst' command to attempt changing the first row of the CSR array 412 causes an illegal exception. Furthermore, VPU context instructions 416 may include an instruction 'vgrm <I>' that causes the VPU 110 to remove a vector group definition by accessing the row in the CSR 412 having index <I>, changing the lane mask in the row to all 0 bits, and change the enable bit in the row to 0. In other examples, the ISA described herein includes different instructions that have similar effects to those described above.

Advantageously, the default configuration stored in the row 502A allows the VPU 110 to efficiently execute a wide range of workloads. In applications that have comparatively high amounts of parallelism, the VPU 110 can operate in its default configuration so that all vector lanes 406 can operate on the large amount of data that corresponds to a vector operation instruction. And in applications with less parallelism, a source can use the CSR instructions 418 to define vector groups 407, thereby allowing the VPU 110 to operate on multiple smaller instructions simultaneously. More generally, a source can adjust the existence of vector groups, the number of vector groups, and the size of vector groups based on the amount of parallelism in an application to ensure the VPU 110 executes the application efficiently.

FIG. 6 is a block diagram of a first example implementation of the VPU 110 of FIGS. 1 and 2. In the example of FIG. 6, the VPU 110 includes the same decoder circuitry 402, instruction buffer 404, vector lanes 406, vector groups 407, context register 410, CSR array 412, vector instructions 308, operation instructions 414, VPU context instructions 416, and CSR instructions 418 that operate as described above in connection with FIGS. 4 and 5. FIG. 6 also includes example sequencer circuitry 602A and 602B (collectively referred to as sequencers 602).

The sequencers 602 refers to multiple instances of the sequencer circuitry 408 that are implemented together on a single chip. That is, both of the sequencer circuitry 602A and 602B obtain one of the operation instructions 414 from the instruction buffer 404, determine the VPU context by reading the context register 410, read the CSR array 412 to identify the vector lanes 406 correspond to the current VPU context, and distribute the operation instruction to the identified vector lanes. The sequencers 602 operate independently from one another such that increasing the number of sequencers 602 increases the rate at which the operation instructions 414 are distributed to the vector lanes 406. Thus, a manufacturer or designer may implement a VPU 110 with multiple sequencers 602 to support use cases with high vector lane throughput. The VPU 110 is shown with two sequencers 602 in the example of FIG. 6. More generally, the VPU 110 includes at least one sequencer circuitry 408 as shown in FIG. 4A but has no upper limit to the number of sequencer instances it can support.

In some examples, the ISA described herein extends the CSR instructions 418 so that a given source circuitry instance can only distribute operation instructions that correspond to specific vector groups. For example, suppose the CSR array 412 included additional data so that sequencer circuitry 602A was assigned to the vector group 407A and sequencer circuitry 602B was assigned to the vector groups 407B and 407C. Such a configuration would enable vector groups 407B and 407C to share data amongst themselves at run time without having to also share data with vector group 407A.

FIG. 7 is an illustrative example of user space pseudocode 700 generated by the software applications 102 of FIGS. 1 and 2. The user space pseudocode 700 includes example programs 702A and 702B (collectively referred to as programs 702). The programs 702 includes example vector group definitions 704A, 704B, 704C, 704D, 704E, 704F, 704G (collectively referred to as vector groups definitions 704) and runtime instructions 706A, 706B (collectively referred to as runtime instructions 706).

In the example of FIG. 7, the privilege instructions 320 indicate a user may manually define the vector groups and/or change the VPU context through the software applications 102. Additionally or alternatively, one or more software applications 102 manually use source code, libraries, etc. in FIG. 7 to define vector groups and change the VPU context without such instructions being visible to a user.

The pseudocode 700 describes two different configurations for the VPU 110A to operate in. The VPU 110 uses a total of three vector groups named VG_A, VG_B, and VG_C to execute the program 702A. In the example of FIG. 7, the pseudocode 700 uses the function .CREATE( ) to both define and name a new vector group. The pseudocode 700 also uses the function .ASSIGN( ) to assign one or more vector lanes to a vector group. In the program 702A, vector group VG_A includes vector lanes 406A-406D, vector group VG_B includes vector lanes 406E and 406F, and vector group VG_C includes vector lanes 406G and 406H. Thus, in use cases that do not include multi-threading or virtualization, a software application 102A may produce the vector group definitions 704A-704C (or functionally equivalent instructions) to cause the VPU 110 to operate in the configuration shown in FIGS. 4-6.

The example of FIGS. 4-6 shows a configuration of the VPU 110 in which all vector lanes assigned to a given vector group are adjacent to one another. More generally, a vector group may include disjoint vector lanes or any other combination of vector lanes. The vector group definitions within a given program may also include an uneven number of vector lanes as discussed above. For example, within the program 702B, the software application 102-*n* defines a vector group VG_D that includes vector lanes 406A and 406E, a vector group VG_E that includes vector lanes 406C and 406D, a vector group VG_F that includes vector lanes 406B, 406F and 406G, and a vector group VG_G that includes only vector lane 406*a*H.

In the pseudocode 700, the vector group definitions 704 are examples of the CSR instructions 418 of FIG. 4A Similarly, a portion of the runtime instructions 706 correspond to the operation instructions 414 of FIG. 4A. As shown in FIG. 7, the ISA described herein expects a source (e.g., the software applications 102, the operating system 104, the hypervisor 206, etc.) to provide CSR instructions 418 before providing operation instructions 414. By doing so, the ISA ensures the CSR array 412 is populated before the sequencer circuitry 408 begins distributing instructions to the vector lanes 406. Thus, the VPU 110 can implement the instruction VG_A.EXECUTE(FUNCTION_A, ARGS_A); by using the vector lanes 406A-406D to perform the operations FUNCTION_A on data that includes at least ARGS_A.

When generating CSR instructions 418, a source (e.g., the software applications 102, the operating system 104, the hypervisor 206, etc.) defines the size of the vector groups based on the vector lengths of the operation instructions 414 that correspond to the vector groups. For example, suppose the execution of FUNCTION_A is implemented with twice as much parallelism as the execution of FUNCTION_B (e.g., operation instructions from FUNCTION_A have vector lengths that are twice as long as the execution of FUNCTION_B). In response to the difference in vector lengths, the software application 102A provides the vector group definitions 704A, 704B, 704C such that the vector group 407A responsible for executing FUNCTION_A is assigned twice as many vector lanes as the vector groups 407B and 407C responsible for executing FUNCTION_B. More generally, given a first instruction with a first amount of parallelism and a longer, second instruction with a second amount of parallelism, a source may define a first vector group to have a first number of vector lanes and a second vector group to have a second number of vector lanes such that a difference between the first number of vector lanes and the second number of vector lanes is proportional to a difference between the first amount of parallelism and the second amount of parallelism.

As described above, computationally efficient vector groups definitions are based on the amount of parallelism in the operation instructions 414 executed by the vector lanes 406. As used herein, the amount of parallelism in an instruction may also be referred to as the parallelism value of the instruction. The parallelism value of an instruction refers to the number of operands that a) correspond to said instruction and b) can be processed by the vector lanes 406 independently of the other operands. For example, using the values of FIG. 4B described above, the parallelism value in an instruction with the maximum vector length of 8192 bits is 128 because the 8192 bits are stored within the VREG fragments 422 as 128 separate 64-bit numbers. Similarly, the instruction from FIG. 4B with a vector length of 4096 bits has a parallelism value of 64 because the 4096 bits are stored within the vector lanes as 64 separate 64-bit numbers.

A source (e.g., the software applications 102, the operating system 104, the hypervisor 206, etc.) may perform any suitable code analysis to determine the amount of parallelism present in an instruction. For example, suppose a source performs code analysis on an instruction to determine the instruction can be implemented by a logical loop (e.g., a for loop, a while loop, etc.) where the execution of each iteration of the loop can be performed independently of one another. In such an example, the parallelism value of the instruction is proportional to the number of iterations of the loop. Once a source determines an instruction has a parallelism value of x, the source defines the vector groups 407 with the goal of distributing the x 64-bit values across the VREG fragments 422 in a manner that maximizes the size of issue windows as described above. In other examples, the parallelism value of an instruction may be expressed in different units.

In general, runtime instructions in the pseudocode 700 may call .EXECUTE( ) any number of times for any vector groups in any order. Furthermore, more than one vector group can execute the same function (e.g., perform the same operations). For example, FUNCTION_C is used three different times in the runtime instructions 706B: twice by VG_D using different arguments each time, and a third time by VG_E.

FIG. 8 is an example of low-level language instructions sent to the SPU 106. The example of FIG. 8 includes instructions 802 and instructions 804. In general, software applications 102 generate instructions in high-level languages. A high-level language refers to a programming language with relatively high complexity. For example, a single line of code in a high-level language program may correspond to multiple lines of code in a low-level language program. Examples of high-level languages found in industry include but are not limited to Python, C++, Java, Pearl, etc.

Compilers convert programs written in high-level language instructions (e.g., the programs 702A and 702B of FIG. 7) into low-level language instructions that are interpretable by a particular type of processor circuitry. A low-level language refers to a program language with comparatively low complexity. For example, each line of code shown in the example of FIG. 8 refers to one action that can be performed by one component of the VPU 110. Examples of low-level languages found in industry are assembly, machine code, object code, etc.

In the example of FIG. 8, a compiler converts the vector group definitions 704A, 704B, and 704C into the instructions 802. Within the instructions 802, the command 'vconfig <r>' is a CSR instruction that causes the decoder circuitry 402 to change the enable bit of the row having index <r> to 1. In this example, the default configuration row has index 0, so 'vconfig 1' refers to row 502B of FIG. 5, 'vconfig 2' refers to row 502C of FIG. 5, etc. The instructions 802 also include the command 'vgset <lanemask>', which overwrites the lane mask 508 of the current CSR row to the value <lanemask>.

The instructions 802 also include the instruction vgmem <name> <addr>, which assigns variables to portions of the memory 108 that are editable by the currently defined vector group. For example, FIG. 8 shows that within the VPU context 1, the variable 'v1' refers to a chunk of memory beginning at address 'addr1'. Within the VPU context 2, the variable 'v1' instead refers to a chunk of memory beginning at address 'addr4'. In this example, the VPU 110 stores the information from a 'vgmem' instruction in the CSRs 504. More generally, although the vector group definitions 704A-704D of FIG. 7 and the instructions 802 of FIG. 8 are written in different programming languages, the vector group definitions 704A-704D and the instructions 802 are both examples of CSR instructions 418 that cause the VPU 110 to operate in the configuration shown in FIGS. 4-6.

In some examples, a software module (e.g., a compiler, the operating system 104, the hypervisor 206, etc.) may add, remove, or edit a set of input instructions to ensure the outgoing stream of instructions provided to the SPU 106 is compliant with the ISA described herein. For example, in FIGS. 7 and 8, a compiler converts the runtime instructions 706A into the instructions 804. To do so, the compiler determines that to execute "VG_A.EXECUTE(FUNCTION_A, ARGS_A);", the VPU 110 must first set the VPU context to the VPU group 407A, then load the data 'a3' into 'addr2', then load the data 'a4' into 'addr3', then use the vector lanes 406A-406D to add the values from <addr2> and <addr3> together and store the results in <addr3>. In the example of FIG. 8, such operations are described using the instructions: "vgctx 1", "vld v2, (a3)", "vld v3, (a4)", and "vadd v3, v2, v3", respectively.

To fully implement the runtime instructions 706A, the vector group 407B executes FUNCTION_B using ARGS_B, and the vector group 407C executes FUNCTION_C using ARGS_C, at the same time that the vector group 407A is adding the values in addr2 and addr3 together. In the example of FIG. 8, the compiler determines that executing FUNCTION_B using ARGS_B requires at least the instruction "vfmv v2,fa5" (which moves value 'fa5' into 'addr5'). Before providing the foregoing instruction to the SPU 106, the compiler provides the instruction 'vgctx 2' to switch the VPU context from the vector group 407A to the vector group 407B. Accordingly, when the sequencer circuitry 408 (or one of the sequencers 602) obtains the instruction "vfmv v2,fa5", the circuitry looks to the CSR 504C and determines the variable v2 corresponds to addr5. Had the VPU context instead remained on the vector group 407A, the sequencer circuitry 408 would have incorrectly looked to the CSR 504B and determined the variable v2 corresponds to addr2. More generally, runtime instructions can correspond to both operation instructions 414 and VPU context instructions 416. A source may add VPU context instructions 416 into an outgoing stream of runtime instructions so that the VPU 110 can interpret and implement the surrounding operation instructions 414 correctly.

In some examples, the portions of the memory 108 accessible by the vector lanes 406 are referred to as vector register. In ISAs that support known VPUs, a compiler would only need to know a beginning address of the vector registers because a) the vector registers collectively form a continuous chunk of the memory 108 and b) all vector lanes perform operations on all vector registers synchronously in known VPUs. In contrast, some vector group definitions (e.g., 704D) may describe a set of vector registers (e.g., the memory accessible by vector lanes 406A and 406E) that are stored separately in the memory 108 from one another. Thus, the ISA described in examples herein expects that a compiler produce low-level instructions that recognize disjunct sets of vector registers. For example, the command 'vgmem' in the instructions 802 may correspond to nonadjacent portions of memory.

While an example manner of implementing the compute devices 100 and 200 of is illustrated in FIGS. 1 and 2, one or more of the elements, processes, and/or devices illustrated in FIGS. 1 and 2 may be combined, divided, re-arranged, omitted, eliminated, and/or implemented in any other way. Further, the software applications 102, the operating system 104, the operating systems 204, the hypervisor 206, the SPU 106, the VPU 110, and/or, more generally, the example compute devices 100 and 200 of FIGS. 1 and 2, may be implemented by hardware alone or by hardware in combination with software and/or firmware. Thus, for example, any of the software applications 102, the operating system 104, the operating systems 204, the hypervisor 206, the SPU 106, the VPU 110, and/or, more generally, the example compute devices 100 and 200 of FIGS. 1 and 2, could be implemented by programmable circuitry in combination with machine readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s)), ASIC(s), programmable logic device(s) (PLD(s)), and/or field programmable logic device(s) (FPLD(s)) such as FPGAs. Further still, the example the example compute devices 100 and 200 of FIGS. 1 and 2 may include one or more elements, processes, and/or devices in addition to, or instead of, those illustrated in FIGS. 1-6, and/or may include more than one of any or all of the illustrated elements, processes and devices.

Flowchart(s) representative of example machine readable instructions, which may be executed by programmable circuitry to implement and/or instantiate the compute devices 100 and 200 of FIGS. 1 and 2 and/or representative of example operations which may be performed by programmable circuitry to implement and/or instantiate compute devices 100 and 200 of FIGS. 1 and 2, are shown in FIGS. 9-12. The machine readable instructions may be one or more executable programs or portion(s) of one or more executable programs for execution by programmable circuitry such as the programmable circuitry 1312 shown in the example programmable circuitry platform 1300 discussed below in connection with FIG. 13 and/or may be one or more function(s) or portion(s) of functions to be performed by the example programmable circuitry (e.g., an FPGA) discussed below in connection with FIGS. 14 and/or 15. In some examples, the machine readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowchart(s) illustrated in FIGS. 9-12, many other methods of implementing the example compute devices 100 and 200 may alternatively be used. For example, the order of execution of the blocks of the flowchart(s) may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine readable instructions may be fragmented and stored on one or more storage devices, disks and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable, computer readable and/or machine readable media, as used herein, may include instructions and/or program(s) regardless of the particular format or state of the machine readable instructions and/or program(s).

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 9-12 may be implemented using executable instructions (e.g., computer readable and/or machine readable instructions) stored on one or more non-transitory computer readable and/or machine readable media. As used herein, the terms non-transitory computer readable medium, non-transitory computer readable storage medium, non-transitory machine readable medium, and/or non-transitory machine readable storage medium are expressly defined to include any type of computer readable storage device and/or storage disk and to exclude propagating signals and to exclude transmission media. Examples of such non-transitory computer readable medium, non-transitory computer readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine readable storage device" are defined to include any physical (mechanical, magnetic and/or electrical) hardware to retain information for a time period, but to exclude propagating signals and to exclude transmission media. Examples of non-transitory computer readable storage devices and/or non-transitory machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer-readable instructions, machine-readable instructions, etc.

Figure 8B:
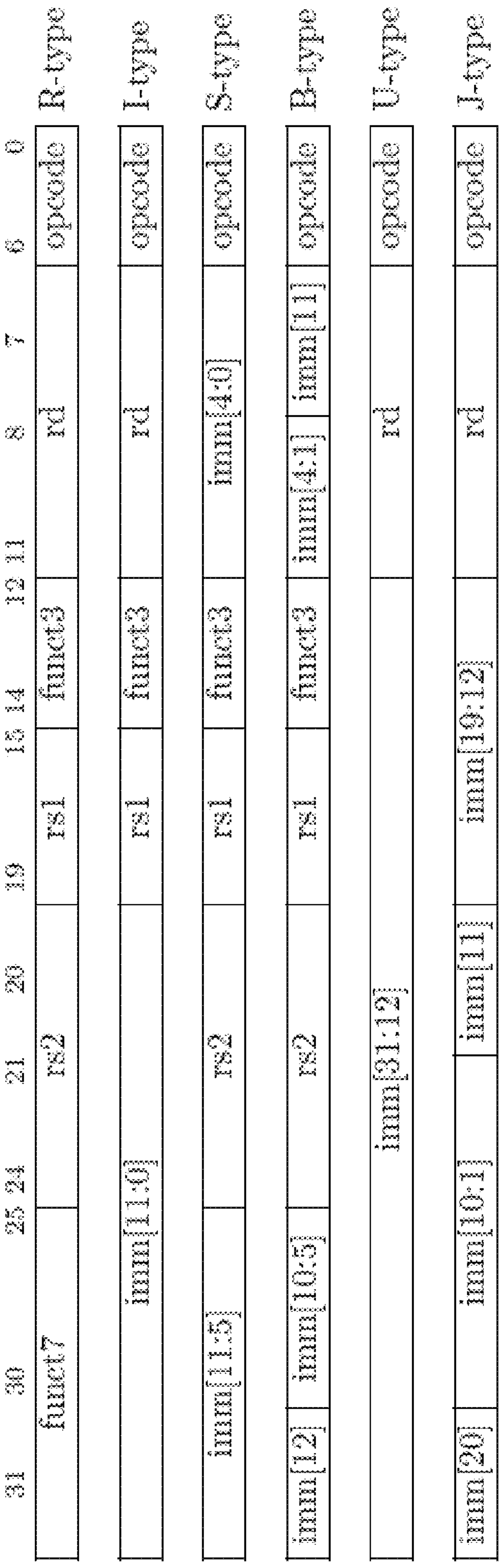
FIG. 8B is an example of an ISA format that may be extended to support the VPU of FIGS. 1 and 2.

FIG. 8B is an example of an ISA format that may be extended to support the VPU of FIGS. 1 and 2. In particular, FIG. 8B describes the instruction formats of the RISC-V ISA. FIG. 8B shows that RISC-V is divided into six basic instruction formats. R-type instructions describe the formatting for register to register operations, I-type instructions the formatting for immediate and load operations, S-type instructions describe the formatting for store operations, B-type instructions describe the formatting for conditional branch operations, U-type instructions describe the formatting for long immediate instructions, and J-type instructions describe the formatting for unconditional jump instructions. In some examples, the instruction sets 802 and 804 of FIG. 8A, and more generally, any low-level instructions that implement the vector instructions 308 described herein, may be converted and/or mapped to one or more of the instruction formats shown in FIG. 8B such that the RISC-V ISA supports the VPU 110 described in examples herein. Additionally or alternatively, the RISC-V ISA may be extended by adding one or more instruction formats in addition to those shown in FIG. 8B. In such examples, the extended instruction formats implement the vector instructions 308 such that the RISC-V ISA supports the VPU 110 described in examples herein.

Figure 9:
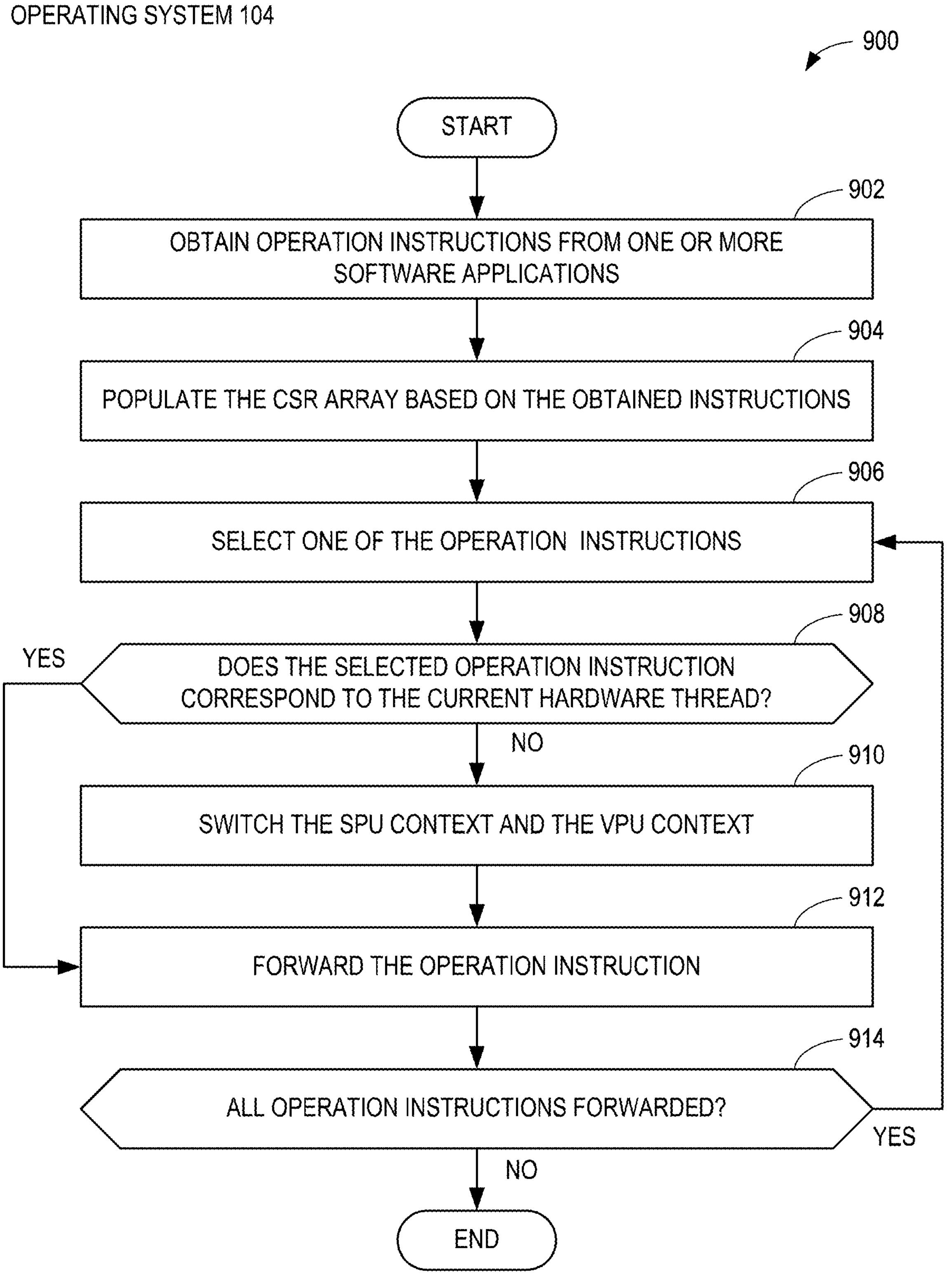
FIG. 9 is a flowchart representative of example machine readable instructions and/or example operations that may be executed, instantiated, and/or performed by example programmable circuitry to implement the operating system of FIG. 1.

FIG. 9 is a flowchart representative of example machine readable instructions and/or example operations 900 that may be executed, instantiated, and/or performed by programmable circuitry to implement multi-threading. The example machine-readable instructions and/or the example operations 900 of FIG. 9 begin when the operating system 104 obtains operation instructions 414 from one or more software applications 102. (Block 902). The operation instructions 414 may correspond to any use case(s) that support multi-threading.

The operating system 104 populates the CSR array 412 based on the obtained instructions. (Block 904). The operating system 104 does so by providing CSR instructions 418 in the outgoing stream of instructions to the SPU 106. The SPU 106 then forwards the CSR instructions 418 and any other types of vector instructions 308 to the VPU 110 as described above. The operating system 104 generates CSR instructions 418 at block 904 that define one vector group per hardware thread. The operating system 104 may also schedule, reorganize, or convert the obtained instructions at block 904 to ensure the outgoing stream of instructions sent to the SPU 106 comply with the ISA described herein.

The operating system 104 selects one of the obtained operation instructions 414. (Block 906). The operating system 104 then determines whether the selected operation instruction corresponds to the current hardware thread. (Block 908). To implement block 908, the operating system 104 or a compiler may interpret the instruction from block 906 itself, and/or interpret surrounding instructions provided by the software applications 102, to determine whether the hardware thread run on the vector group currently identified in the context register 410 is responsible for executing the operation instruction of block 906.

If the operating system 104 determines the operation instruction of block 906 corresponds to the current hardware thread (Block 908: Yes), control proceeds to block 912. Alternatively, if the operation instruction of block 906 does not match the current hardware thread, the operating system 104 switches both the SPU context and the VPU context. (Block 910). To switch the SPU context, the operating system 104 generates a scalar instruction that causes the SPU 106 to distribute the next set of operations to a different functional instance of the scalar executor circuitry 304. To switch the VPU context, the operating system 104 generates a context instruction 416 that updates the context register 410 as described above. Switching the SPU context and the VPU context together enables the software applications 102 to generate operation instructions using a 1:1 correspondence between the functional divisions of the scalar executor circuitry 304 and the vector groups 407. In examples that support multi-threading such as the flowchart of FIG. 9, only the operating system 104 is privileged and able to change the VPU context. Accordingly, the software applications 102 are not able to generate VPU context instructions 416 in this example.

In some examples, the VPU 110 described in examples herein is implemented in a compute device where the SPU does not support parallel operations. In such examples, the operating system 104 switches the VPU context at block 910 without changing the SPU context.

After block 908 or block 910, the operating system 104 forwards the operation instruction of block 906 to the VPU 110 via the SPU 106. (Block 912). In examples where a change in VPU context is needed, forwarding the operation instruction after the VPU context switch occurs ensures that the VPU 110 uses the correct vector group to execute the operation instruction.

The operating system 104 determines whether all of the operation instructions from block 902 have been forwarded. (Block 914). If all operation instructions have not been forwarded (Block 914: Yes), control returns to block 906 where the operating system 104 selects a different operation instruction that has not yet been forwarded. Alternatively, if the operating system 104 has not yet forwarded all of the operation instructions 414, the machine-readable instructions and/or operations 900 end.

The machine-readable instructions and/or operations 900 describe an example in which the operating system 104 defines vector groups and switches the VPU context to support multi-threading. In other examples, (e.g., the pseudocode 700 of FIG. 7), the vector groups are instead defined by the software applications 102. In such other examples, the software applications 102 are privileged and able to generate operation instructions 414, VPU context instructions 416, and CSR instructions 418 as described above in connection with FIG. 7. Accordingly, the operating system 104 may schedule, reorganize, or convert instructions from the software applications 102 in such examples but is not responsible for controlling the vector groups.

Figure 10:
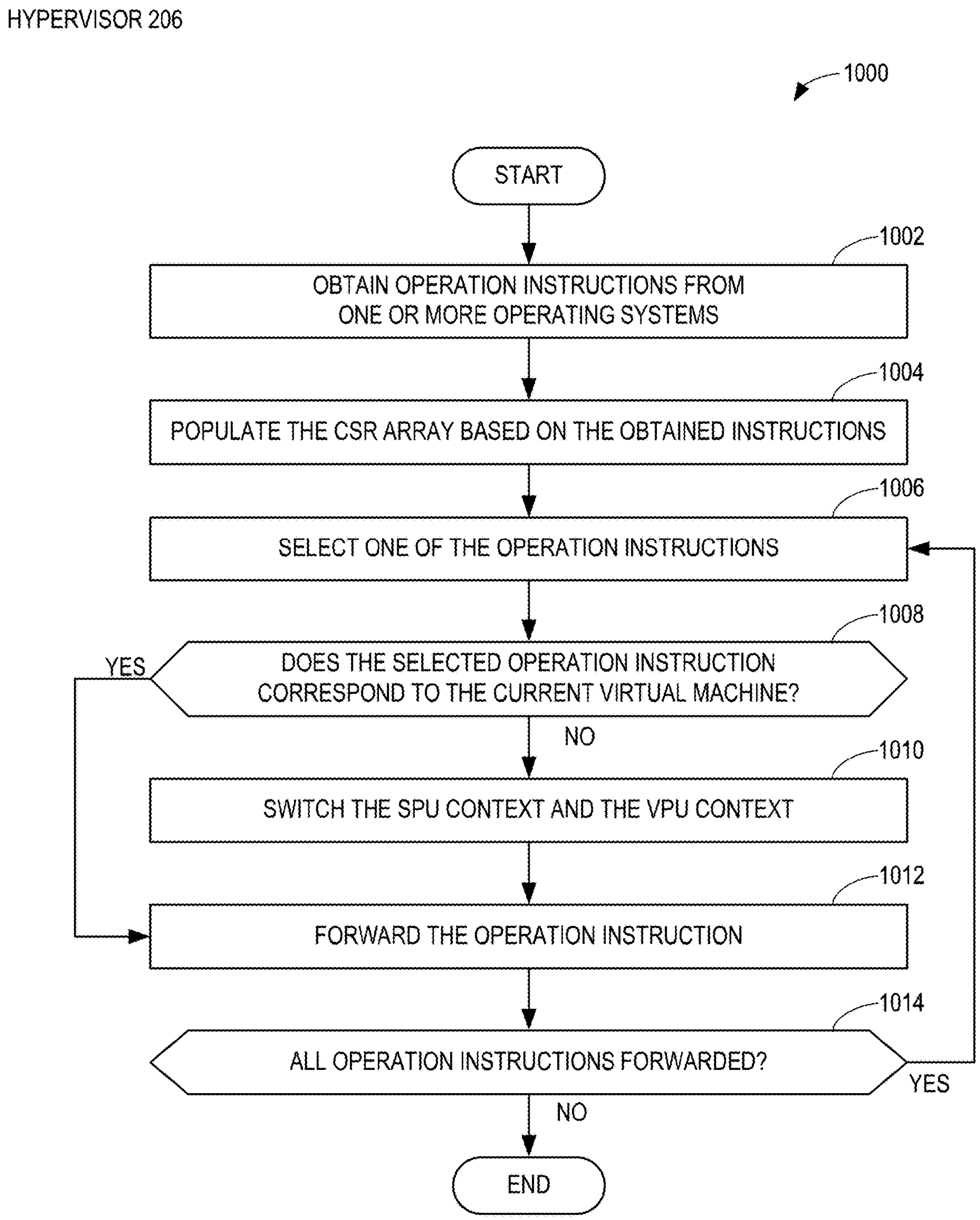
FIG. 10 is a flowchart representative of example machine readable instructions and/or example operations that may be executed, instantiated, and/or performed by example programmable circuitry to implement the hypervisor of FIG. 2.

FIG. 10 is a flowchart representative of example machine readable instructions and/or example operations that may be executed, instantiated, and/or performed by example programmable circuitry to implement the hypervisor 206 of FIG. 2 to support virtualization. The example machine-readable instructions and/or the example operations 1000 of FIG. 10 begin when the hypervisor 206 obtains instructions from one or more operating systems 204. (Block 1002). In some examples, the operating systems 204 obtain one or of more of the operation instructions 414 from the software applications 102. The operation instructions 414 may correspond to any use case(s) that support virtualization.

The hypervisor 206 populates the CSR array 412 based on the obtained instructions. (Block 1004). The hypervisor 206 does so by providing CSR instructions 418 in the outgoing stream of instructions to the SPU 106. The SPU 106 then forwards the CSR instructions 418 and any other types of vector instructions 308 to the VPU 110 as described above. The operating system 104 generates CSR instructions 418 at block 904 that define one vector group per virtual machine. The hypervisor 206 may also schedule, reorganize, or convert the obtained instructions at block 904 to ensure the outgoing stream of instructions sent to the SPU 106 complies with the ISA described herein.

The hypervisor 206 implements blocks 1006, 1008, 1010, 1012, and 1014 of FIG. 10 using the same techniques that the operating system 104 uses to implement blocks 906, 908, 910, 912, and 914 of FIG. 9 respectively. That is, the hypervisor 206 selects one of the operation instructions, switches the SPU and VPU context if the current virtual machine does not match the selected instruction, and then forwards the operation instruction to the VPU 110 via the SPU 106. In the example of FIG. 10, only the hypervisor 206 is privileged and able to change the VPU context. Accordingly, neither the software applications 102 nor the operating systems 204 can generate VPU context instructions 416 in the example of FIG. 10. In the example of FIG. 10, the machine-readable instructions and/or the example operations 1000 support the implementation of virtual machines. In other examples, the machine-readable instructions and/or the example operations 1000 support the implementation of a different kind of virtual executing environment (VEE).

Figure 11:
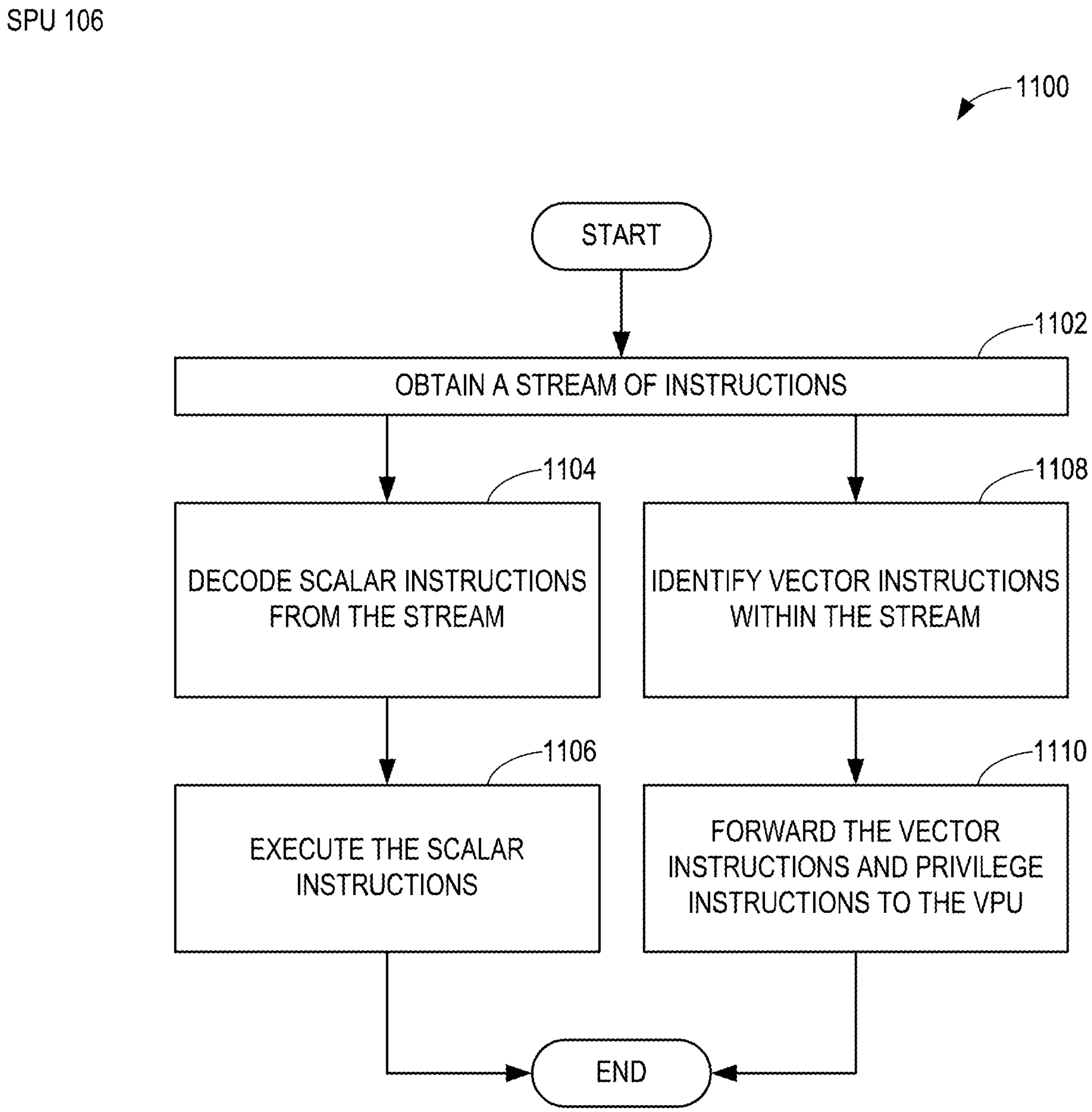
FIG. 11 is a flowchart representative of example machine readable instructions and/or example operations that may be executed, instantiated, and/or performed by example programmable circuitry to implement the SPU of FIGS. 1 and 2.

FIG. 11 is a flowchart representative of example machine readable instructions and/or example operations 1100 that may be executed, instantiated, and/or performed by example programmable circuitry to implement the SPU 106 of FIGS. 1 and 2. In the example of FIG. 11, the machine readable instructions and/or operations 1100 begin when the SPU 106 obtains a stream of instructions. (Block 1102). The stream of instructions may be provided by any source, including but not limited to the operating system 104 of FIG. 1 and the hypervisor 206 of FIG. 2.

The decoder circuitry 302 decodes scalar instructions 306 from the stream. (Block 1104). The scalar executor circuitry 304 then executes the scalar instructions. (Block 1106). In some examples, the scalar executor circuitry 304 implements block 1106 by performing parallel operations 310 as described above.

In parallel with blocks 1104 and 1106, the decoder circuitry 302 also identifies vector instructions 308 within the obtained stream of instructions. (Block 1108). The decoder circuitry 302 then forwards both the vector instructions 308 and the privilege instructions 320 to the VPU 110. (Block 1110). The machine-readable instructions and/or operations 1100 end after both blocks 1106 and 1110 are implemented.

Figure 12:
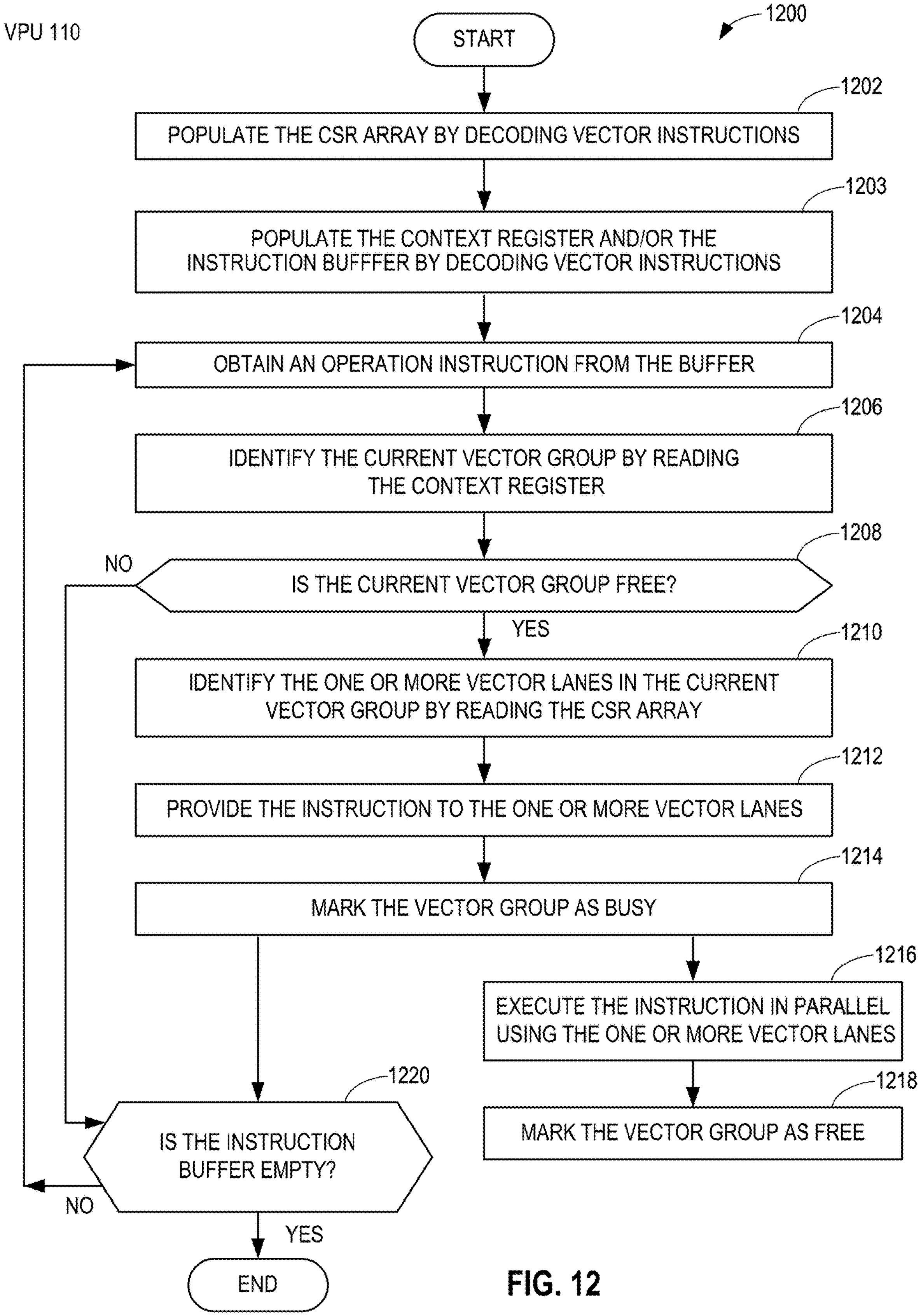
FIG. 12 is a flowchart representative of example machine readable instructions and/or example operations that may be executed, instantiated, and/or performed by example programmable circuitry to implement the VPU of FIGS. 1 and 2.

FIG. 12 is a flowchart representative of example machine readable instructions and/or example operations 1200 that may be executed, instantiated, and/or performed by example programmable circuitry to implement the VPU 110 of FIGS. 1 and 2. In the example of FIG. 12, the machine readable instructions and/or operations 1200 begin when the decoder circuitry 402 populates the CSR array 412 by decoding the vector instructions 308 provided by the SPU 106. (Block 1202). The decoder circuitry 402 determines whether a given vector instruction is a CSR instruction 418, a context instruction 416, or an operation instruction 414 by performing decoding operations. The decoder circuitry 402 then updates the data stored in the CSR array 412 based on the CSR instructions 418.

The decoder circuitry 402 also populates the context register 410 and/or the instruction buffer 404 by decoding the vector instructions 308. (Block 1203). The decoder circuitry 402 updates the context register 410 and the instruction buffer 404 based on the VPU context instructions 416 and the operation instructions 414, respectively. The decoder circuitry 402 implements block 1203 continuously and in parallel with blocks 1204-1220 to support VPU pipelining (e.g., executing first operation instructions with the vector lanes 406 while simultaneously loading second operations instructions into the instruction buffer 404). However, the decoder circuitry 402 does not implement block 1202 concurrently with blocks 1203-1220 because the CSR array 412 must be updated and finalized before a given set of runtime instructions can be implemented correctly.

The sequencer circuitry 408 obtains an operation instruction from the instruction buffer 404. (Block 1204). In this example, the instruction buffer 404 operates with a First In First Out (FIFO) technique. Accordingly, the operation instruction obtained at any given instance block 1204 is the oldest instruction in the instruction buffer 404 at that time. The sequencer circuitry 408 also removes the obtained instruction from the instruction buffer 404 at block 1204.

The sequencer circuitry 408 identifies the current vector group by reading the context register 410. (Block 1206). In some examples, the current vector group of block 1206 is also referred to as the VPU context as described above. The sequencer circuitry 408 then determines whether the current vector group is free. (Block 1208). As used above and herein, a vector group is considered free whenever it is not actively performing an operation instruction. Conversely, a vector group is considered busy whenever it is actively performing an operation instruction. In this example, a vector group's current designation as free or busy is part of the status data stored in one of the CSRs 504 of the CSR array 412.

If the current vector group is busy (Block 1208: No), control proceeds to block 1220. Alternatively, if the current vector group is free (Block 1208: Yes), the sequencer circuitry 408 identifies the one or more vector lanes 406 that define the current vector group by reading the CSR array 412. (Block 1210). To do so, the sequencer circuitry 408 reads one of the lane masks 508 from the row that corresponds to the current VPU context as described above in connection with FIG. 5.

The sequencer circuitry 408 provides the operation instruction from block 1204 to the one or more vector lanes 406 identified at block 1210. (Block 1212). The sequencer circuitry 408 then marks the current vector group as busy (Block 1214) by updating the appropriate CSR within the CSR array 412.

In response to the distribution of the operation instruction at block 1212, the one or more vector lanes 406 execute the operation instruction in parallel with one another. (Block 1216). The amount of time required for the one or more vector lanes 406 to execute block 1216 is based on the amount of data per instruction supported by the vector lanes 406 (e.g., 64 bits in the example of FIGS. 4 and 6) and the clock speed of the vector lanes 406. Once the execution of the operation completes, the sequencer circuitry 408 marks the vector group as free. (Block 1218).

While the current vector group executes the operation instruction at block 1216, or if the current vector group was busy (Block 1208: No), the sequencer circuitry 408 determines whether the instruction buffer 404 was empty. (Block 1220). If the instruction buffer is not empty (Block 1220: No), control returns to block 1204 where the sequencer circuitry 408 obtains the next operation instruction from the instruction buffer 404. Accordingly, the sequencer circuitry 408 does not need to wait for a first operation instruction to complete at block 1216 before performing additional operations. Rather, by iterating through the loop in the example flowchart of FIG. 12 a second time, the sequencer circuitry 408 can distribute a second operation instruction to a second vector group (e.g., 407B) while the first vector group (e.g., 407A) is still executing the first operation instruction. More generally, the sequencer circuitry 408 continues to distribute operation instructions until all of the vector groups 407 are marked busy and executing different operation instructions in parallel with one another. Once a given vector group 407A is marked free, the sequencer circuitry 408 finds the next operation instruction in the instruction buffer 404 that corresponds to said vector group 407A and distributes said operation instruction to the appropriate one or more vector lanes 406. Alternatively, if the instruction buffer 404 is empty (Block 1220: Yes), the machine-readable instructions and/or operations 1200 end.

In the foregoing example of FIG. 12, the VPU 110 is implemented with one instance of the sequencer circuitry 408 as shown in FIG. 4A. In other examples, the VPU 110 is implemented with multiple sequencers 602 as shown in FIG. 6. In such examples, the machine-readable instructions and/or operations 900 cause each of the sequencers 602 to implement blocks 1204-1214, 1218, and 1220 in parallel with one another.

Figure 13:
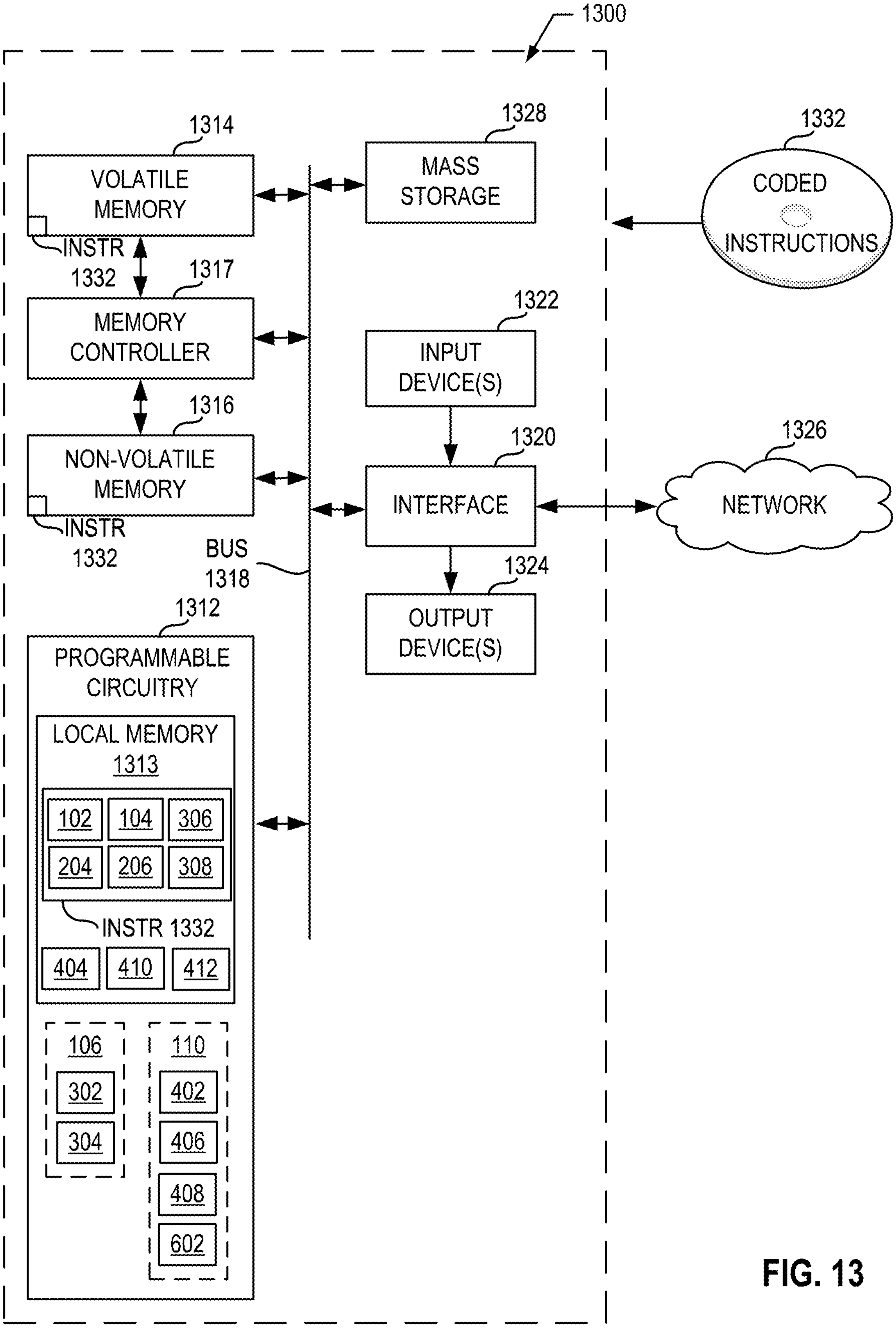
FIG. 13 is a block diagram of an example processing platform including programmable circuitry structured to execute, instantiate, and/or perform the example machine readable instructions and/or perform the example operations of FIGS. 9-12 to implement the compute devices 100 and/or 200 of FIGS. 1 and/or 2 of FIGS. 1 and 2.

FIG. 13 is a block diagram of an example programmable circuitry platform 1300 structured to execute and/or instantiate the example machine-readable instructions and/or the example operations of FIGS. 9-12 to implement the compute devices 100 and 200 of FIGS. 1 and 2. The programmable circuitry platform 1300 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing and/or electronic device.

The programmable circuitry platform 1300 of the illustrated example includes programmable circuitry 1312. The programmable circuitry 1312 of the illustrated example is hardware. For example, the programmable circuitry 1312 can be implemented by one or more integrated circuits, logic circuits, FPGAs, microprocessors, CPUs, GPUs, DSPs, and/or microcontrollers from any desired family or manufacturer. The programmable circuitry 1312 may be implemented by one or more semiconductor based (e.g., silicon based) devices. In this example, the programmable circuitry 1312 implements the decoder circuitry 302 and scalar executor circuitry 304 of the SPU 106, the decoder circuitry 402, the vector lanes 406, the sequencer circuitry 408, and/or the sequencers 602 of the VPU 110.

The programmable circuitry 1312 of the illustrated example includes a local memory 1313 (e.g., a cache, registers, etc.). In this example, the local memory 1313 includes the instruction buffer 404, the context register 410, and the CSR array 412. The programmable circuitry 1312 of the illustrated example is in communication with main memory 1314, 1316, which includes a volatile memory 1314 and a non-volatile memory 1316, by a bus 1318. The volatile memory 1314 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 1316 may be implemented by flash memory and/or any other desired type of memory device. Access to the main memory 1314, 1316 of the illustrated example is controlled by a memory controller 1317. In some examples, the memory controller 1317 may be implemented by one or more integrated circuits, logic circuits, microcontrollers from any desired family or manufacturer, or any other type of circuitry to manage the flow of data going to and from the main memory 1314, 1316. In this example, the main memory 1314 and 1316 implement the memory 108.

The programmable circuitry platform 1300 of the illustrated example also includes interface circuitry 1320. The interface circuitry 1320 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 1322 are connected to the interface circuitry 1320. The input device(s) 1322 permit(s) a user (e.g., a human user, a machine user, etc.) to enter data and/or commands into the programmable circuitry 1312. The input device(s) 1322 can be implemented by, for example, an audio sensor, a microphone, a camera (still or video), a keyboard, a button, a mouse, a touchscreen, a trackpad, a trackball, an isopoint device, and/or a voice recognition system.

One or more output devices 1324 are also connected to the interface circuitry 1320 of the illustrated example. The output device(s) 1324 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 1320 of the illustrated example, thus, typically includes a graphics driver card, a graphics driver chip, and/or graphics processor circuitry such as a GPU.

The interface circuitry 1320 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 1326. The communication can be by, for example, an Ethernet connection, a digital subscriber line (DSL) connection, a telephone line connection, a coaxial cable system, a satellite system, a beyond-line-of-sight wireless system, a line-of-sight wireless system, a cellular telephone system, an optical connection, etc.

The programmable circuitry platform 1300 of the illustrated example also includes one or more mass storage discs or devices 1328 to store firmware, software, and/or data. Examples of such mass storage discs or devices 1328 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine readable instructions 1332, which may be implemented by the machine readable instructions of FIGS. 9-12, may be stored in the mass storage device 1328, in the volatile memory 1314, in the non-volatile memory 1316, and/or on at least one non-transitory computer readable storage medium such as a CD or DVD which may be removable. In this example, the machine readable instructions 1332 implement the software applications 102, the operating system 104, the operating systems 204, the hypervisor 206, the scalar instructions 306, and/or the vector instructions 308.

Figure 14:
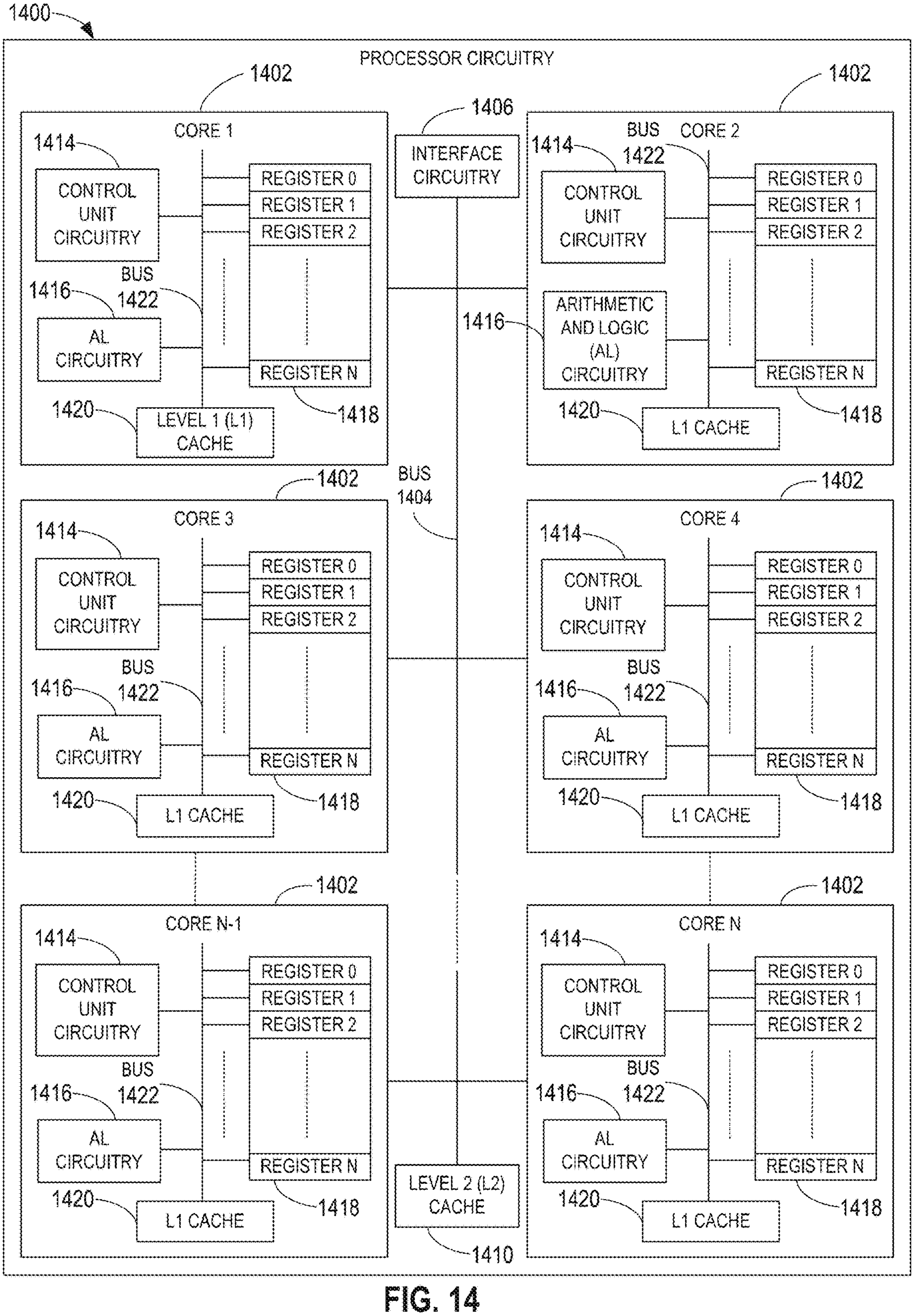
FIG. 14 is a block diagram of an example implementation of the programmable circuitry of FIG. 13.

FIG. 14 is a block diagram of an example implementation of the programmable circuitry 1312 of FIG. 13. In this example, the programmable circuitry 1312 of FIG. 13 is implemented by a microprocessor 1400. For example, the microprocessor 1400 may be a general-purpose microprocessor (e.g., general-purpose microprocessor circuitry). The microprocessor 1400 executes some or all of the machine-readable instructions of the flowcharts of FIGS. 9-12 to effectively instantiate the circuitry of FIGS. 1-6 as logic circuits to perform operations corresponding to those machine readable instructions. In some such examples, the circuitry of FIGS. 1-6 is instantiated by the hardware circuits of the microprocessor 1400 in combination with the machine-readable instructions. For example, the microprocessor 1400 may be implemented by multi-core hardware circuitry such as a CPU, a DSP, a GPU, an XPU, etc. Although it may include any number of example cores 1402 (e.g., 1 core), the microprocessor 1400 of this example is a multi-core semiconductor device including N cores. The cores 1402 of the microprocessor 1400 may operate independently or may cooperate to execute machine readable instructions. For example, machine code corresponding to a firmware program, an embedded software program, or a software program may be executed by one of the cores 1402 or may be executed by multiple ones of the cores 1402 at the same or different times. In some examples, the machine code corresponding to the firmware program, the embedded software program, or the software program is split into threads and executed in parallel by two or more of the cores 1402. The software program may correspond to a portion or all of the machine readable instructions and/or operations represented by the flowcharts of FIGS. 9-12.

The cores 1402 may communicate by a first example bus 1404. In some examples, the first bus 1404 may be implemented by a communication bus to effectuate communication associated with one(s) of the cores 1402. For example, the first bus 1404 may be implemented by at least one of an Inter-Integrated Circuit (I2C) bus, a Serial Peripheral Interface (SPI) bus, a PCI bus, or a PCIe bus. Additionally or alternatively, the first bus 1404 may be implemented by any other type of computing or electrical bus. The cores 1402 may obtain data, instructions, and/or signals from one or more external devices by example interface circuitry 1406. The cores 1402 may output data, instructions, and/or signals to the one or more external devices by the interface circuitry 1406. Although the cores 1402 of this example include example local memory 1420 (e.g., Level 1 (L1) cache that may be split into an L1 data cache and an L1 instruction cache), the microprocessor 1400 also includes example shared memory 1410 that may be shared by the cores (e.g., Level 2 (L2 cache)) for high-speed access to data and/or instructions. Data and/or instructions may be transferred (e.g., shared) by writing to and/or reading from the shared memory 1410. The local memory 1420 of each of the cores 1402 and the shared memory 1410 may be part of a hierarchy of storage devices including multiple levels of cache memory and the main memory (e.g., the main memory 1314, 1316 of FIG. 13). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 1402 may be referred to as a CPU, DSP, GPU, etc., or any other type of hardware circuitry. Each core 1402 includes control unit circuitry 1414, arithmetic and logic (AL) circuitry (sometimes referred to as an ALU) 1416, a plurality of registers 1418, the local memory 1420, and a second example bus 1422. Other structures may be present. For example, each core 1402 may include vector unit circuitry, single instruction multiple data (SIMD) unit circuitry, load/store unit (LSU) circuitry, branch/jump unit circuitry, floating-point unit (FPU) circuitry, etc. The control unit circuitry 1414 includes semiconductor-based circuits structured to control (e.g., coordinate) data movement within the corresponding core 1402. The AL circuitry 1416 includes semiconductor-based circuits structured to perform one or more mathematic and/or logic operations on the data within the corresponding core 1402. The AL circuitry 1416 of some examples performs integer based operations. In other examples, the AL circuitry 1416 also performs floating-point operations. In yet other examples, the AL circuitry 1416 may include first AL circuitry that performs integer-based operations and second AL circuitry that performs floating-point operations. In some examples, the AL circuitry 1416 may be referred to as an Arithmetic Logic Unit (ALU).

The registers 1418 are semiconductor-based structures to store data and/or instructions such as results of one or more of the operations performed by the AL circuitry 1416 of the corresponding core 1402. For example, the registers 1418 may include vector register(s), SIMD register(s), general-purpose register(s), flag register(s), segment register(s), machine-specific register(s), instruction pointer register(s), control register(s), debug register(s), memory management register(s), machine check register(s), etc. The registers 1418 may be arranged in a bank as shown in FIG. 14. Alternatively, the registers 1418 may be organized in any other arrangement, format, or structure, such as by being distributed throughout the core 1402 to shorten access time. The second bus 1422 may be implemented by at least one of an I2C bus, a SPI bus, a PCI bus, or a PCIe bus.

Each core 1402 and/or, more generally, the microprocessor 1400 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 1400 is a semiconductor device fabricated to include many transistors interconnected to implement the structures described above in one or more integrated circuits (ICs) contained in one or more packages.

The microprocessor 1400 may include and/or cooperate with one or more accelerators (e.g., acceleration circuitry, hardware accelerators, etc.). In some examples, accelerators are implemented by logic circuitry to perform certain tasks more quickly and/or efficiently than can be done by a general-purpose processor. Examples of accelerators include ASICs and FPGAs such as those discussed herein. A GPU, DSP and/or other programmable device can also be an accelerator. Accelerators may be on-board the microprocessor 1400, in the same chip package as the microprocessor 1400 and/or in one or more separate packages from the microprocessor 1400.

Figure 15:
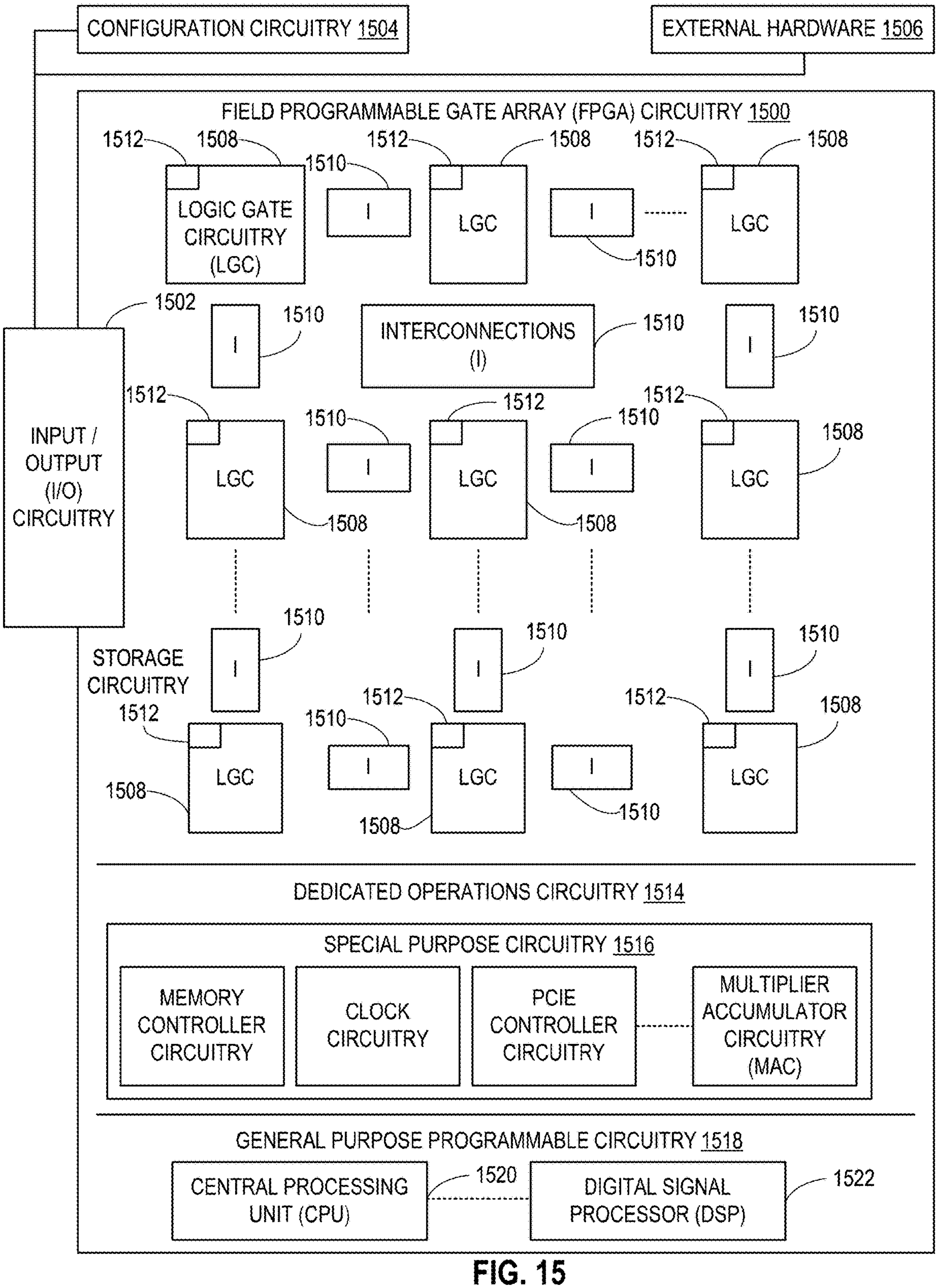
FIG. 15 is a block diagram of another example implementation of the programmable circuitry of FIG. 13.

FIG. 15 is a block diagram of another example implementation of the programmable circuitry 1312 of FIG. 13. In this example, the programmable circuitry 1312 is implemented by FPGA circuitry 1500. For example, the FPGA circuitry 1500 may be implemented by an FPGA. The FPGA circuitry 1500 can be used, for example, to perform operations that could otherwise be performed by the example microprocessor 1400 of FIG. 14 executing corresponding machine readable instructions. However, once configured, the FPGA circuitry 1500 instantiates the operations and/or functions corresponding to the machine readable instructions in hardware and, thus, can often execute the operations/functions faster than they could be performed by a general-purpose microprocessor executing the corresponding software.

More specifically, in contrast to the microprocessor 1400 of FIG. 14 described above (which is a general purpose device that may be programmed to execute some or all of the machine readable instructions represented by the flowchart(s) of FIGS. 9-12 but whose interconnections and logic circuitry are fixed once fabricated), the FPGA circuitry 1500 of the example of FIG. 15 includes interconnections and logic circuitry that may be configured, structured, programmed, and/or interconnected in different ways after fabrication to instantiate, for example, some or all of the operations/functions corresponding to the machine readable instructions represented by the flowchart(s) of FIGS. 9-12. In particular, the FPGA circuitry 1500 may be thought of as an array of logic gates, interconnections, and switches. The switches can be programmed to change how the logic gates are interconnected by the interconnections, effectively forming one or more dedicated logic circuits (unless and until the FPGA circuitry 1500 is reprogrammed). The configured logic circuits enable the logic gates to cooperate in different ways to perform different operations on data received by input circuitry. Those operations may correspond to some or all of the instructions (e.g., the software and/or firmware) represented by the flowchart(s) of FIGS. 9-12. As such, the FPGA circuitry 1500 may be configured and/or structured to effectively instantiate some or all of the operations/functions corresponding to the machine readable instructions of the flowchart(s) of FIGS. 9-12 as dedicated logic circuits to perform the operations/functions corresponding to those software instructions in a dedicated manner analogous to an ASIC. Therefore, the FPGA circuitry 1500 may perform the operations/functions corresponding to the some or all of the machine readable instructions of FIGS. 9-12 faster than the general-purpose microprocessor can execute the same.

In the example of FIG. 15, the FPGA circuitry 1500 is configured and/or structured in response to being programmed (and/or reprogrammed one or more times) based on a binary file. In some examples, the binary file may be compiled and/or generated based on instructions in a hardware description language (HDL) such as Lucid, Very High Speed Integrated Circuits (VHSIC) Hardware Description Language (VHDL), or Verilog. For example, a user (e.g., a human user, a machine user, etc.) may write code or a program corresponding to one or more operations/functions in an HDL; the code/program may be translated into a low-level language as needed; and the code/program (e.g., the code/program in the low-level language) may be converted (e.g., by a compiler, a software application, etc.) into the binary file. In some examples, the FPGA circuitry 1500 of FIG. 15 may access and/or load the binary file to cause the FPGA circuitry 1500 of FIG. 15 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 1500 of FIG. 15 to cause configuration and/or structuring of the FPGA circuitry 1500 of FIG. 15, or portion(s) thereof.

In some examples, the binary file is compiled, generated, transformed, and/or otherwise output from a uniform software platform utilized to program FPGAs. For example, the uniform software platform may translate first instructions (e.g., code or a program) that correspond to one or more operations/functions in a high-level language (e.g., C, C++, Python, etc.) into second instructions that correspond to the one or more operations/functions in an HDL. In some such examples, the binary file is compiled, generated, and/or otherwise output from the uniform software platform based on the second instructions. In some examples, the FPGA circuitry 1500 of FIG. 15 may access and/or load the binary file to cause the FPGA circuitry 1500 of FIG. 15 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 1500 of FIG. 15 to cause configuration and/or structuring of the FPGA circuitry 1500 of FIG. 15, or portion(s) thereof.

The FPGA circuitry 1500 of FIG. 15, includes example input/output (I/O) circuitry 1502 to obtain and/or output data to/from example configuration circuitry 1504 and/or external hardware 1506. For example, the configuration circuitry 1504 may be implemented by interface circuitry that may obtain a binary file, which may be implemented by a bit stream, data, and/or machine-readable instructions, to configure the FPGA circuitry 1500, or portion(s) thereof. In some such examples, the configuration circuitry 1504 may obtain the binary file from a user, a machine (e.g., hardware circuitry (e.g., programmable or dedicated circuitry) that may implement an Artificial Intelligence/Machine Learning (AI/ML) model to generate the binary file), etc., and/or any combination(s) thereof). In some examples, the external hardware 1506 may be implemented by external hardware circuitry. For example, the external hardware 1506 may be implemented by the microprocessor 1400 of FIG. 14.

The FPGA circuitry 1500 also includes an array of example logic gate circuitry 1508, a plurality of example configurable interconnections 1510, and example storage circuitry 1512. The logic gate circuitry 1508 and the configurable interconnections 1510 are configurable to instantiate one or more operations/functions that may correspond to at least some of the machine readable instructions of FIGS. 9-12 and/or other desired operations. The logic gate circuitry 1508 shown in FIG. 15 is fabricated in blocks or groups. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 1508 to enable configuration of the electrical structures and/or the logic gates to form circuits to perform desired operations/functions. The logic gate circuitry 1508 may include other electrical structures such as look-up tables (LUTs), registers (e.g., flip-flops or latches), multiplexers, etc.

The configurable interconnections 1510 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 1508 to program desired logic circuits.

The storage circuitry 1512 of the illustrated example is structured to store result(s) of the one or more of the operations performed by corresponding logic gates. The storage circuitry 1512 may be implemented by registers or the like. In the illustrated example, the storage circuitry 1512 is distributed amongst the logic gate circuitry 1508 to facilitate access and increase execution speed.

The example FPGA circuitry 1500 of FIG. 15 also includes example dedicated operations circuitry 1514. In this example, the dedicated operations circuitry 1514 includes special purpose circuitry 1516 that may be invoked to implement commonly used functions to avoid the need to program those functions in the field. Examples of such special purpose circuitry 1516 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 1500 may also include example general purpose programmable circuitry 1518 such as an example CPU 1520 and/or an example DSP 1522. Other general purpose programmable circuitry 1518 may additionally or alternatively be present such as a GPU, an XPU, etc., that can be programmed to perform other operations.

Although FIGS. 14 and 15 illustrate two example implementations of the programmable circuitry 1312 of FIG. 13, many other approaches are contemplated. For example, FPGA circuitry may include an on-board CPU, such as one or more of the example CPU 1520 of FIG. 14. Therefore, the programmable circuitry 1312 of FIG. 13 may additionally be implemented by combining at least the example microprocessor 1400 of FIG. 14 and the example FPGA circuitry 1500 of FIG. 15. In some such hybrid examples, one or more cores 1402 of FIG. 14 may execute a first portion of the machine readable instructions represented by the flowchart(s) of FIGS. 9-12 to perform first operation(s)/function(s), the FPGA circuitry 1500 of FIG. 15 may be configured and/or structured to perform second operation(s)/function(s) corresponding to a second portion of the machine readable instructions represented by the flowcharts of FIGS. 9-12, and/or an ASIC may be configured and/or structured to perform third operation(s)/function(s) corresponding to a third portion of the machine readable instructions represented by the flowcharts of FIGS. 9-12.

It should be understood that some or all of the circuitry of FIGS. 1-6 may, thus, be instantiated at the same or different times. For example, same and/or different portion(s) of the microprocessor 1400 of FIG. 14 may be programmed to execute portion(s) of machine-readable instructions at the same and/or different times. In some examples, same and/or different portion(s) of the FPGA circuitry 1500 of FIG. 15 may be configured and/or structured to perform operations/functions corresponding to portion(s) of machine-readable instructions at the same and/or different times.

In some examples, some or all of the circuitry of FIGS. 1-6 may be instantiated, for example, in one or more threads executing concurrently and/or in series. For example, the microprocessor 1400 of FIG. 14 may execute machine readable instructions in one or more threads executing concurrently and/or in series. In some examples, the FPGA circuitry 1500 of FIG. 15 may be configured and/or structured to carry out operations/functions concurrently and/or in series. Moreover, in some examples, some or all of the circuitry of FIGS. 1-6 may be implemented within one or more virtual machines and/or containers executing on the microprocessor 1400 of FIG. 14.

In some examples, the programmable circuitry 1312 of FIG. 13 may be in one or more packages. For example, the microprocessor 1400 of FIG. 14 and/or the FPGA circuitry 1500 of FIG. 15 may be in one or more packages. In some examples, an XPU may be implemented by the programmable circuitry 1312 of FIG. 13, which may be in one or more packages. For example, the XPU may include a CPU (e.g., the microprocessor 1400 of FIG. 14, the CPU 1520 of FIG. 15, etc.) in one package, a DSP (e.g., the DSP 1522 of FIG. 15) in another package, a GPU in yet another package, and an FPGA (e.g., the FPGA circuitry 1500 of FIG. 15) in still yet another package.

Figure 16:
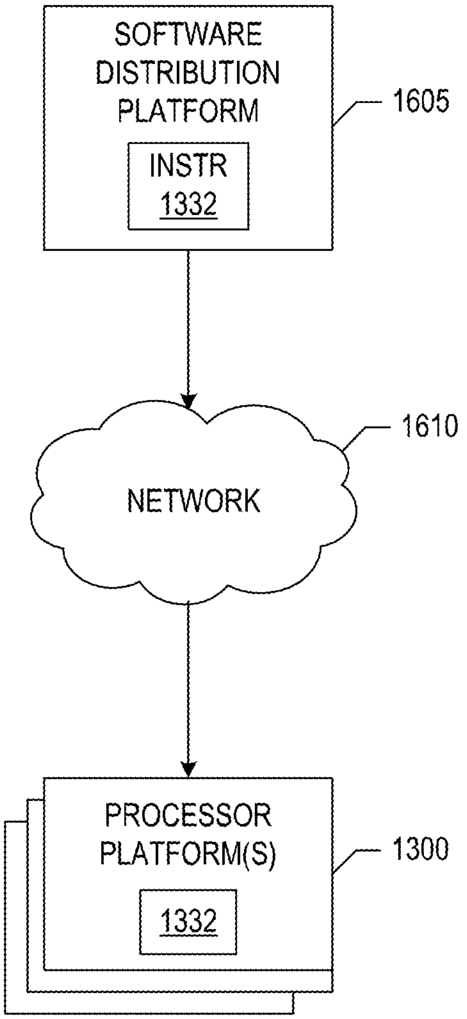
FIG. 16 is a block diagram of an example software/firmware/instructions distribution platform (e.g., one or more servers) to distribute software, instructions, and/or firmware (e.g., corresponding to the example machine readable instructions of FIGS. 9-12) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

A block diagram illustrating an example software distribution platform 1605 to distribute software such as the example machine readable instructions 1332 of FIG. 13 to other hardware devices (e.g., hardware devices owned and/or operated by third parties from the owner and/or operator of the software distribution platform) is illustrated in FIG. 16. The example software distribution platform 1605 may be implemented by any computer server, data facility, cloud service, etc., capable of storing and transmitting software to other computing devices. The third parties may be customers of the entity owning and/or operating the software distribution platform 1605. For example, the entity that owns and/or operates the software distribution platform 1605 may be a developer, a seller, and/or a licensor of software such as the example machine readable instructions 1332 of FIG. 13. The third parties may be consumers, users, retailers, OEMs, etc., who purchase and/or license the software for use and/or re-sale and/or sub-licensing. In the illustrated example, the software distribution platform 1605 includes one or more servers and one or more storage devices. The storage devices store the machine readable instructions 1332, which may correspond to the example machine readable instructions of FIGS. 9-12, as described above. The one or more servers of the example software distribution platform 1605 are in communication with an example network 1610, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 1332 from the software distribution platform 1605. For example, the software, which may correspond to the example machine readable instructions of FIGS. 9-12, may be downloaded to the example programmable circuitry platform 1300, which is to execute the machine readable instructions 1332 to implement one or more components of the compute devices 100 and/or 200. In some examples, one or more servers of the software distribution platform 1605 periodically offer, transmit, and/or force updates to the software (e.g., the example machine readable instructions 1332 of FIG. 13) to ensure improvements, patches, updates, etc., are distributed and applied to the software at the end user devices. Although referred to as software above, the distributed "software" could alternatively be firmware.

FIGS. 17, 18A, 18B, and 13 include example computing architectures in which any of the techniques and configurations above may be implemented. For example, the VPU 110 may be integrated into various forms of the hardware components described below.

Figure 17:
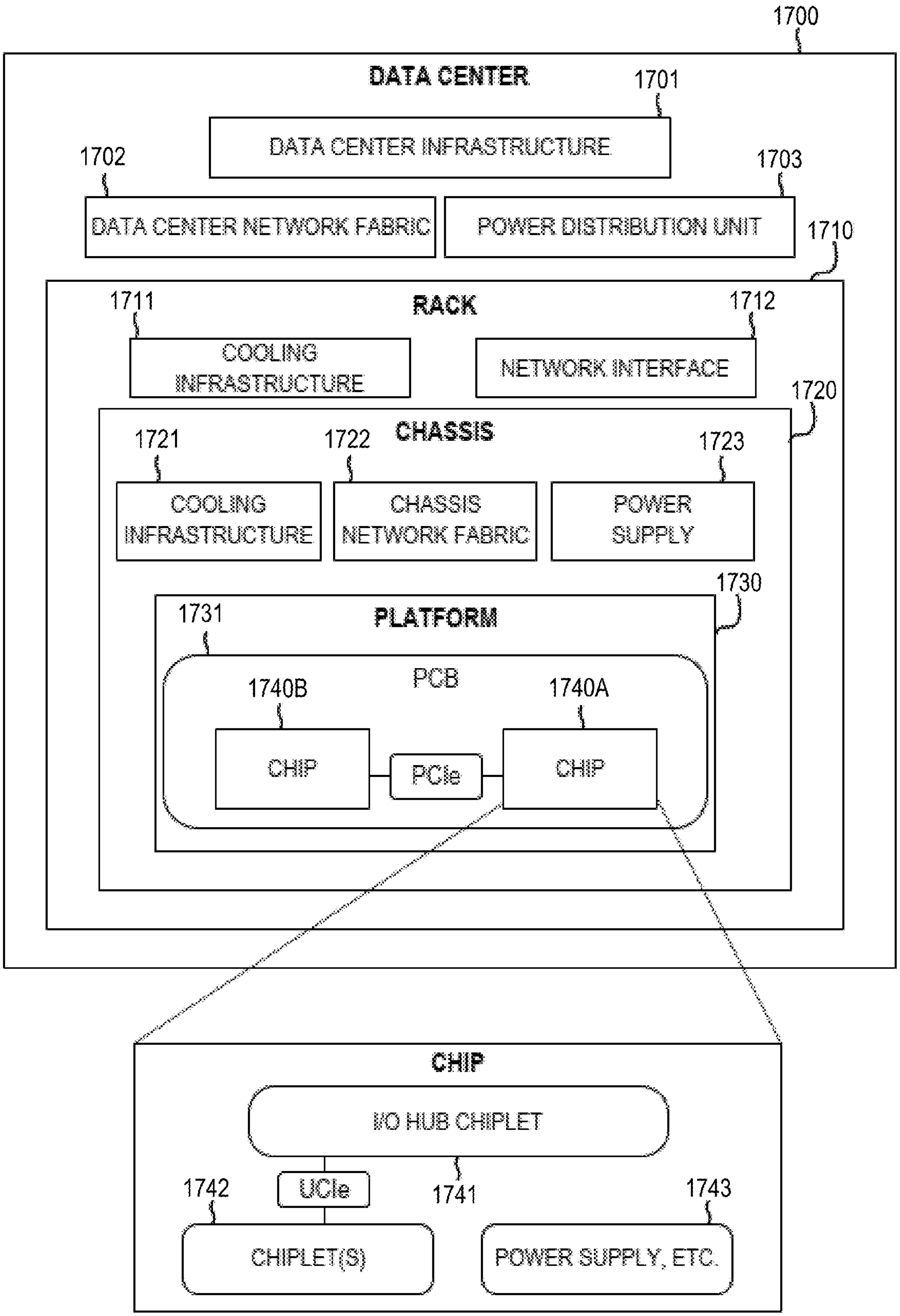
FIG. 17 is a block diagram of an example implementation of a data center used to provide multiple examples or instances of the computing systems of FIG. 1 or 2.

FIG. 17 illustrates an example hardware arrangement of an example data center 1700 used to provide multiple examples or instances of a computing system (e.g., the programmable circuitry platform 1300, described below), with each example of the computing system identified as a respective platform (e.g., the platform 1730, described below). The data center 1700 includes example data center infrastructure 1701, an example data center network fabric 1702, and an example power distribution unit 1703 to support multiple racks of compute platforms, with a single instance of an example rack 1710 depicted. The data center infrastructure 1701 may provide physical components that host the compute platform hardware, storage components, and/or networking equipment. The data center network fabric 1702 may include switches and/or networking components to support data flows among various compute platforms and storage devices throughout the data center. The power distribution unit 1703 may include components to distribute and/or control power among the various compute platforms, networking, and storage devices.

The rack 1710 of FIG. 17 includes, but is not limited to, example cooling infrastructure 1711, an example network interface 1712, and/or other related physical components to support discrete instances of multiple chassis. The rack 1710 provides power, connectivity, and/or cooling to each of the multiple chassis in a single rack, with a single instance of a chassis 1720 in the example of in FIG. 17. The chassis 1720 includes, but is not limited to, example cooling infrastructure 1721, an example chassis network fabric 1722, and an example power supply 1723, which provides cooling, network connectivity, and/or power to multiple platforms within the chassis. Although a single instance of an example platform 1730 is depicted in FIG. 17, in some examples, a common data center rack configuration may include dozens of chassis, with each chassis to support a number of platforms depending on the physical size of the platform hardware and/or supporting equipment.

The platform 1730 of FIG. 17 may be referred to as a server or node, depending on the use case for the platform 1730 and the data center 1700. The platform 1730 includes but is not limited to examples of a discrete computing system hosted on a single board. In FIG. 17, the platform 1730 is depicted as hosting a first example chip assembly 1740A and a second example chip assembly 1740B on a first board provided by a printed circuitry board (PCB) or other platform board, shown as an example PCB 1731. In some examples, the platform 1730 may include only one chip package, whereas the PCB 1731 depicts interconnection of multiple chip assemblies via an interface (e.g., a peripheral component interconnect express (PCIe) interface). Additional chip packages and components may also be hosted on the PCB 1731.

Some examples of the chip assembly 1740A, 1740B of FIG. 17 may be termed as a System-on-Chip (SoC) package, as modular chiplets that perform different functions are integrated into a single package—even though this chip package is composed of multiple dies unlike a traditional SoC design that uses a single die. Other examples of the chip assembly 1740A, 1740B may include a System-on-Package (SoP), System-in-a-Package (SiP), or other single chip packages. Various combinations of 2 dimension (D), 2.5D, and/or 3D packaging technologies may be used to manufacture and/or assemble the chip package and its underlying structure. Additionally, different manufacturing processes may be used to provide chiplets and components from different process nodes (e.g., semiconductor fabrication systems).

The first chip assembly 1740A and the second chip assembly 1740B of FIG. 17 are packages that include multiple chiplets and/or dies for respective functions, such as separate chiplets for processing (e.g., central processing unit (CPU) or graphical processing unit (GPU) chiplets), memory (e.g., cache or high-bandwidth memory chiplets), input/output (I/O) (e.g., I/O chiplets), acceleration (e.g., artificial intelligence (AI)/machine learning (ML) acceleration chiplets), signal processing (e.g., audio or video processing chiplets), etc. The close-up of chip assembly 1740A of FIG. 17 includes a I/O Hub chiplet 1741, chiplets 1742, and a power supply 1743. These components may be hosted on an interposer that is designed to connect multiple dies and/or components within a single semiconductor package (e.g., chip package). In some examples, the chiplets 1742 may be manufactured and/or sourced separately and later assembled into the chip package to create the chip assembly 1740A. Various connections may be provided among the chiplets 1742, such as with the use of Universal Chiplet Interconnect Express (UCIe) interfaces and communications, and/or between chiplets and on-chip memory (e.g., high-bandwidth memory (HBM)) using HBM3 (JEDEC), Universal Memory Interface (UMI), or other memory interfaces.

Figure 18A:
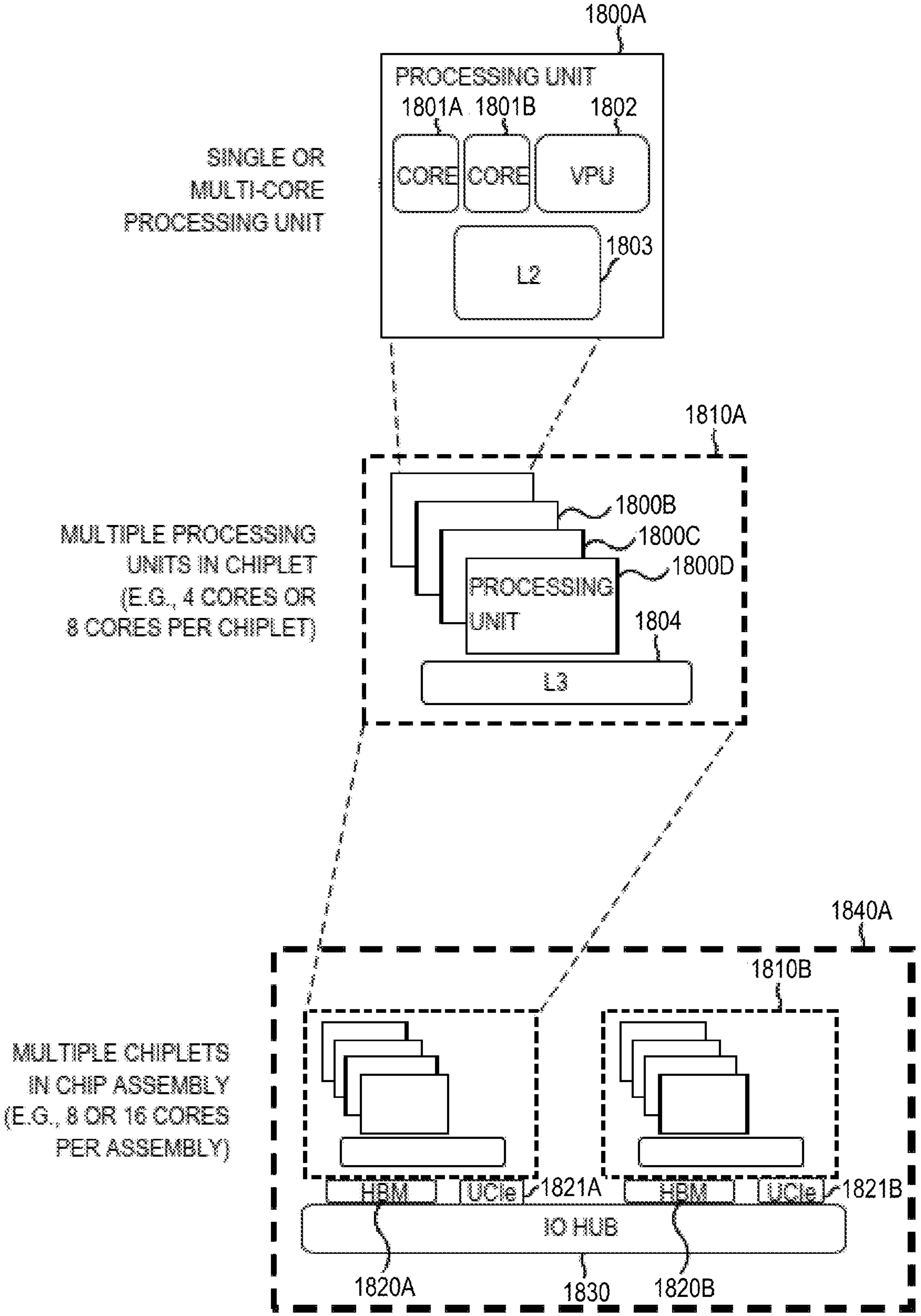
FIG. 18A is a block diagram of a first example implementation of a chip assembly of FIG. 17.

FIG. 18A depicts an example arrangement of an example chip assembly 1840A (e.g., a multi-processing core example of the first chip assembly 1740A or the second chip assembly 1740B of FIG. 17), with expanded views of the chiplets and processing units included therein. In FIG. 18A the chip assembly 1840A, which may constitute a SoC, SoP, SiP, and/or other type of chip package, includes chiplets such as an example chiplet 1810A, an example chiplet 1810B, etc. and associated on-package memory (e.g., high-speed memory) such as 3D-stacked, High Bandwidth Memory (HBM) instances (shown as an example HBM 1820A, an example HBM 1820B, interfaces (e.g., UCIe interfaces) shown as an example UCIe 1821A, an example UCIe 1821B, and an example I/O hub 1830 (e.g., which may be implemented by a I/O chiplet). Other hardware elements of a chip package are not depicted for simplicity. Although the examples disclosed herein are described in conjunction with UCLe interfaces, one or more of the interfaces may be device-to-device (Dev2Dev) interfaces (e.g., CXLI, peripheral component interconnect express (PCIE)), die to die (D2D) interfaces (e.g., NVLINK), chiplet to chiplet (Ch2Ch) interfaces (e.g., universal chiplet interconnected express (UCIe)), core to core (C2C) interfaces (e.g., using coherency protocols), etc.

The chiplets 1810A, 1810B of FIG. 18A include multiple processing units and the example processing units 1800A, 1800B, 1800C, 1800D include one or multiple cores, respectively. For example, the chiplet 1810A of FIG. 18A includes four processing units (the processing units 1800A, 1800B, 1800C, 1800D) and an example Level 3 (L3) cache 1804. The processing units 1800A, 1800B, 1800C, 1800D may include one or multiple processing cores, one or multiple caches, other processing units and/or passive and/or active elements. For example, processing unit 1800A includes two cores (an example core 1801A and an example core 1801B), vector processing unit 1802, and an example level 2 (L2) cache 1803. Accordingly, a single-core processing unit can provide four cores per chiplet and eight total cores in a two-chiplet chip assembly, whereas a dual-core processing unit can provide eight cores per chiplet and sixteen total cores in a two-chiplet chip assembly. However, examples disclosed herein may correspond to other permutations.

Figure 18B:
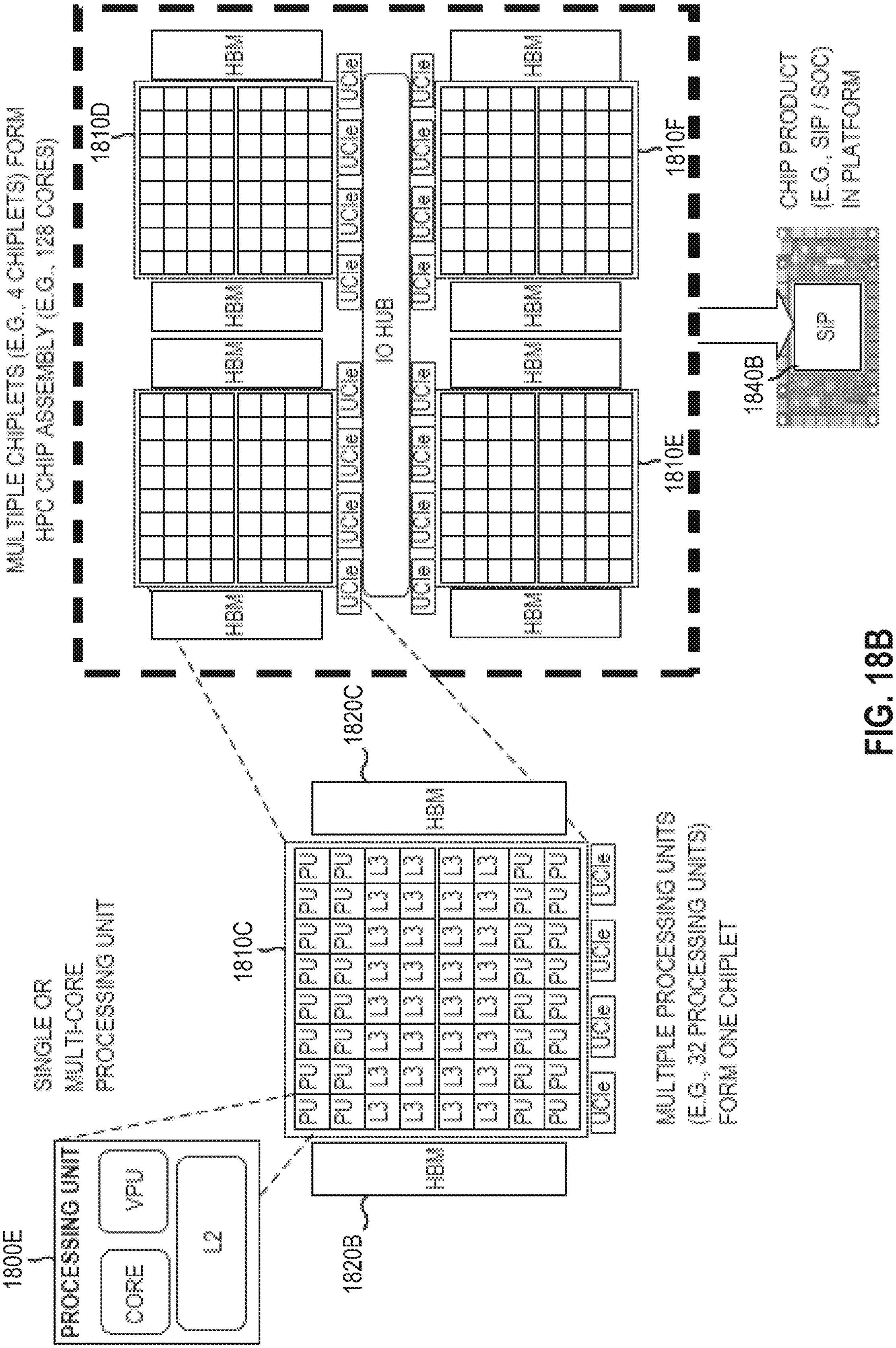
FIG. 18B is a block diagram of a second example implementation of a chip assembly of FIG. 17.

FIG. 18B is an example arrangement of an example chip assembly 1840B (e.g., a multi-chiplet high-performance computing (HPC) example of chip assembly 1740A, 1740B), adapted for HPC applications (e.g., parallel processing operations involving thousands, millions, or more of processors and/or cores operating simultaneously). The example chip assembly 1840B illustrates placement as a SiP, SoC, and/or other package onto a platform board (e.g., the PCB 1731 of FIG. 17). The platform board may be in a data center (e.g., the data center 1700 of FIG. 17) or in a standalone deployment setting (e.g., in a standalone computer system, mobile computing device, autonomous device, etc.).

The chip assembly 1840B of FIG. 18B is composed of multiple chiplets, shown with four chiplets, including example chiplets 1810C, 1810D, 1810E, 1810F. The chiplets 1810C, 1810D, 1810E, 1810F include multiple processing units, such as thirty two processing units with a corresponding level 3 (L3) cache for each processing unit. The processing units may include one or multiple cores, such as an example single-core processing unit 1800E shown as part of the chiplet 1810C. The chip assembly 1840B also includes corresponding memory resources, such as HBM elements corresponding to respective banks of processing units (e.g., HBM 1820B and HBM 1820C corresponding respective sets of processing units of chiplet 1810C), UCIe interfaces, and/or an IO Hub.

The chip assembly and related products or devices described herein may be configured in a variety of computing system examples. Such examples include non-transitory machine-readable media storing machine-readable instructions and one or more processors coupled to the memory, such that executing the machine-readable instructions configure one or more of the processors and/or implementing hardware (e.g., the processing unit 1800, the chiplet 1810, the chip 1740, and/or the platform 1730 of FIGS. 17, 18A, and/or 18B) to perform operations described above for electronic systems or devices. It should be further understood that software, including one or more machine readable instructions, that facilitate processing and operations as described above may be distributed, installed, or otherwise provided to networked devices (e.g., servers or cloud computing systems). Alternatively, in some examples, the software may be obtained and loaded (or, re-loaded/upgraded) from one or more servers and/or cloud computing systems, such as software stored on a server for distribution over the Internet, for example.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, connection references (e.g., attached, coupled, connected, and joined) may include intermediate members between the elements referenced by the connection reference and/or relative movement between those elements unless otherwise indicated. As such, connection references do not necessarily infer that two elements are directly connected and/or in fixed relation to each other. As used herein, stating that any part is in "contact" with another part is defined to mean that there is no intermediate part between the two parts.

Unless specifically stated otherwise, descriptors such as "first," "second," "third," "fourth", etc., are used herein without imputing or otherwise indicating any meaning of priority, physical order, arrangement in a list, and/or ordering in any way, but are merely used as labels and/or arbitrary names to distinguish elements for ease of understanding the disclosed examples. In some examples, the descriptor "first" may be used to refer to an element in the detailed description, while the same element may be referred to in a claim with a different descriptor such as "second" or "third." In such instances, it should be understood that such descriptors are used merely for identifying those elements distinctly within the context of the discussion (e.g., within a claim) in which the elements might, for example, otherwise share a same name.

As used herein, "approximately" and "about" modify their subjects/values to recognize the potential presence of variations that occur in real world applications. For example, "approximately" and "about" may modify dimensions that may not be exact due to manufacturing tolerances and/or other real world imperfections as will be understood by persons of ordinary skill in the art. For example, "approximately" and "about" may indicate such dimensions may be within a tolerance range of +/−10% unless otherwise specified herein.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein integrated circuit/circuitry is defined as one or more semiconductor packages containing one or more circuit elements such as transistors, capacitors, inductors, resistors, current paths, diodes, etc. For example an integrated circuit may be implemented as one or more of an ASIC, an FPGA, a chip, a microchip, programmable circuitry, a semiconductor substrate coupling multiple circuit elements, a system on chip (SoC), etc.

From the foregoing, it will be appreciated that example systems, apparatus, articles of manufacture, and methods have been disclosed that enable a Vector Processing Unit (VPU) to execute multiple operation instructions simultaneously and in parallel with one another. Disclosed systems, apparatus, articles of manufacture, and methods improve the efficiency of using a computing device by assigning vector lane circuits into two or more vector groups such that the vector groups form mutually exclusive subsets of the vector lanes, obtaining operation instructions at runtime, and distributing the operation instructions such that each vector group executes its own operation instruction independently and in parallel with the other vector groups. An ISA described herein allows vector lanes to be arbitrarily defined into vector groups by a user space program, defined by an operating system so that each vector group supports one hardware thread in a multi-threading use case, or defined by a hypervisor so that each vector group supports one virtual machine in a virtualization use case. The ISA defines a VPU context that describes which vector group corresponds to the current operation instruction. User space programs are not privileged and not able to edit VPU context in examples that support multi-threading or virtualization. However, in other examples, the ISA allows user space programs full control to edit and control the VPU context. Disclosed systems, apparatus, articles of manufacture, and methods are accordingly directed to one or more improvement(s) in the operation of a machine such as a computer or other electronic and/or mechanical device.

Example methods, apparatus, systems, and articles of manufacture to implement vector processing units are disclosed herein. Further examples and combinations thereof include the following.

Example 1 includes a vector processing unit (VPU) comprising a plurality of vector lanes, the vector lanes able to collectively process an instruction of a first length, and sequencer circuitry arranged to distribute a second instruction to a first subset of the vector lanes, the second instruction having a second length shorter than the first length, and distribute a third instruction to a second subset of the vector lanes, the second subset of the vector lanes to execute the third instruction in parallel with the execution of the second instruction by the first subset of the vector lanes.

Example 2 includes the VPU of example 1, wherein the first subset of the vector lanes is mutually exclusive from the second subset of the vector lanes.

Example 3 includes the VPU of example 1 or claim 2, including memory to store a first lane mask that defines the first subset of the vector lanes, a first Configuration and Status Register (CSR) that corresponds to the first subset of the vector lanes, a second lane mask that defines the second subset of the vector lanes, and a second CSR that corresponds to the second subset of the vector lanes.

Example 4 includes the VPU of example 3, wherein the memory is to store a third lane mask that defines a third subset of the vector lanes, a first enable bit that indicates that the sequencer circuitry can distribute instructions to the first subset of the vector lanes, a second enable bit that indicates that the sequencer circuitry can distribute instructions the second subset of the vector lanes, and a third enable bit that indicates that the sequencer circuitry cannot distribute instructions to the third subset of the vector lanes.

Example 5 includes the VPU of example 4, including decoder circuitry to write the first lane mask, the first CSR, the second lane mask, the second CSR, the first enable bit, the second enable bit, or the third enable bit to memory before the sequencer circuitry distributes the second instruction or the third instruction.

Example 6 includes the VPU of any of examples 1 to 5, wherein the second instruction is part of a first program that has a first amount of parallelism, and the third instruction is part of a second program that has a second amount of parallelism which is less than the first amount of parallelism.

Example 7 includes the VPU of example 6, wherein the first subset of the vector lanes includes a first number of vector lanes, the second subset of the vector lanes includes a second number of vector lanes that is less than the first number of vector lanes, and a difference between the first number of vector lanes and the second number of vector lanes is proportional to a difference between the first amount of parallelism and the second amount of parallelism.

Example 8 includes the VPU of any one of examples 1 to 7, wherein the VPU further includes a context register, the sequencer circuitry is to read the context register, distribute the second instruction to the first subset of the vector lanes based on a determination that the context register refers to the first subset of the vector lanes, reread the context register after distributing the second instruction, and distribute the third instruction to the second subset of the vector lanes based on a determination that the context register has changed to refer to the second subset of the vector lanes.

Example 9 includes the VPU of any one of examples 1 to 8, wherein the sequencer circuitry is first sequencer circuitry, and the VPU includes a second sequencer circuitry to distribute a fourth instruction to a third subset of the vector lanes, the third subset of the vector lanes to execute the fourth instruction in parallel with the execution of the second instruction by the first subset of the vector lanes and the execution of the third instruction by the second subset of the vector lanes.

Example 10 includes a system comprising a software application to generate a first instruction having a first length and a second instruction having a second length, and a vector processing unit (VPU) to include a plurality of vector lanes, the vector lanes to collectively process a third instruction of a third length that is longer than the first length and the second length, and sequencer circuitry to distribute the first instruction to a first subset of the vector lanes, and distribute the second instruction to a second subset of the vector lanes, the second subset of the vector lanes to execute the second instruction in parallel with the execution of the second instruction by the first subset of the vector lanes.

Example 11 includes the system of example 10, wherein the software application is to define the first subset of the vector lanes and the second subset of the vector lanes, and provide the definitions to the VPU before providing the first instruction or the second instruction.

Example 12 includes the system of example 10 or example 11, wherein the software application includes a compiler to assign the first instruction to a first set of vector registers in memory, the first subset of the vector lanes accesses the first set of vector registers to execute the first instruction, and the first set of vector registers are stored separately from one another in the memory.

Example 13 includes the system of any one of examples 10 to 12, wherein the first instruction is part of a first hardware thread executed by the first subset of the vector lanes, and the second instruction is part of a second hardware thread executed by the second subset of the vector lanes.

Example 14 includes the system of example 13, including an operating system to define the first subset of the vector lanes based on an amount of parallelism in the first hardware thread, define the second subset of the vector lanes based on an amount of parallelism in the second hardware thread, and provide the definitions to the VPU before forwarding the first instruction or the second instruction to the VPU.

Example 15 includes the system of any one of examples 10 to 13, including an operating system, wherein the operating system is to provide context instructions that describe whether to distribute the first instruction to the first subset of the vector lanes or the second subset of the vector lanes, and the operating system is privileged to generate the context instructions, and the software application is not privileged to generate the context instructions.

Example 16 includes the system of example 15, including a scalar processing unit (SPU), wherein the context instructions are second context instructions, and the operating system is to provide the second context instructions to the VPU in response to providing first context instructions to the SPU.

Example 17 includes a system comprising a first operating system to generate a first instruction having a first length, a second operating system to generate a second instruction having a second length, a hypervisor to provide the first instruction and the second instruction to a vector processing unit (VPU), and the VPU including a plurality of vector lanes, the vector lanes to collectively process a third instruction of a third length that is longer than the first length and the second length, and sequencer circuitry to distribute the first instruction to a first subset of the vector lanes, and distribute the second instruction to a second subset of the vector lanes, the second subset of the vector lanes to execute the second instruction in parallel with the execution of the second instruction by the first subset of the vector lanes.

Example 18 includes the system of example 17, wherein the first instruction is associated with a first virtual execution environment (VEE) executed by the first subset of the vector lanes, the first VEE corresponding to the first operating system, and the second instruction is associated of a second VEE executed by the second subset of the vector lanes, the second VEE corresponding to the second operating system.

Example 19 includes the system of example 18, wherein the hypervisor is to define the first subset of the vector lanes based on an amount of parallelism associated with the first VEE, define the second subset of the vector lanes based on an amount of parallelism associated with the second VEE, and provide the definitions to the VPU before forwarding the first instruction or the second instruction to the VPU.

Example 20 includes the system of any one of examples 17 to 19, wherein the hypervisor is to provide context instructions that describe whether to distribute the first instruction to the first subset of the vector lanes or the second subset of the vector lanes, and the hypervisor is privileged to generate the context instructions, and the first operating system and the second operating system are not privileged to generate the context instructions.

Example 21 includes the system of example 20, further including a scalar processing unit (SPU), wherein the context instructions are second context instructions, and the hypervisor is to provide the second context instructions to the VPU in response to providing first context instructions to the SPU.

The following claims are hereby incorporated into this Detailed Description by this reference. Although certain example systems, apparatus, articles of manufacture, and methods have been disclosed herein, the scope of coverage of this patent is not limited thereto. On the contrary, this patent covers all systems, apparatus, articles of manufacture, and methods fairly falling within the scope of the claims of this patent.

What is claimed is:

1. A vector processing unit (VPU) comprising:

a plurality of vector lanes, the vector lanes able to collectively process a first instruction of a first length; and sequencer circuitry to:

distribute a second instruction to a first subset of the vector lanes, the second instruction having a second length shorter than the first length; and distribute a third instruction to a second subset of the vector lanes, the second subset of the vector lanes to execute the third instruction in parallel with the execution of the second instruction by the first subset of the vector lanes.

2. The VPU of claim 1, wherein the first subset of the vector lanes is mutually exclusive from the second subset of the vector lanes.

3. The VPU of claim 1, including memory to store:
a first lane mask that defines the first subset of the vector lanes;
a first Configuration and Status Register (CSR) that corresponds to the first subset of the vector lanes;
a second lane mask that defines the second subset of the vector lanes; and
a second CSR that corresponds to the second subset of the vector lanes.

4. The VPU of claim 3, wherein the memory is to store:
a third lane mask that defines a third subset of the vector lanes;
a first enable bit that indicates that the sequencer circuitry can distribute instructions to the first subset of the vector lanes;
a second enable bit that indicates that the sequencer circuitry can distribute instructions the second subset of the vector lanes; and
a third enable bit that indicates that the sequencer circuitry cannot distribute instructions to the third subset of the vector lanes.

5. The VPU of claim 4, including decoder circuitry to write one or more of the first lane mask, the first CSR, the second lane mask, the second CSR, the first enable bit, the second enable bit, or the third enable bit to memory before the sequencer circuitry distributes the second instruction or the third instruction.

6. The VPU of claim 5, wherein:
the second instruction is part of a first program that has a first amount of parallelism; and
the third instruction is part of a second program that has a second amount of parallelism which is less than the first amount of parallelism.

7. The VPU of claim 6, wherein:
the first subset of the vector lanes includes a first number of vector lanes;
the second subset of the vector lanes includes a second number of vector lanes that is less than the first number of vector lanes; and
a difference between the first number of vector lanes and the second number of vector lanes is proportional to a difference between the first amount of parallelism and the second amount of parallelism.

8. The VPU of claim 7, wherein:
the VPU further includes a context register;
the sequencer circuitry is to:
read the context register;
distribute the second instruction to the first subset of the vector lanes based on a determination that the context register refers to the first subset of the vector lanes;
reread the context register after distributing the second instruction; and
distribute the third instruction to the second subset of the vector lanes based on a determination that the context register has changed to refer to the second subset of the vector lanes.

9. The VPU of claim 8, wherein:
the sequencer circuitry is first sequencer circuitry; and
the VPU includes a second sequencer circuitry to distribute a fourth instruction to a third subset of the vector lanes, the third subset of the vector lanes to execute the fourth instruction in parallel with the execution of the second instruction by the first subset of the vector lanes and the execution of the third instruction by the second subset of the vector lanes.

10. A system comprising:
a software application to generate a first instruction having a first length and a second instruction having a second length; and
a vector processing unit (VPU) to include:
a plurality of vector lanes, the vector lanes to collectively process a third instruction of a third length that is longer than the first length and the second length; and
sequencer circuitry to:
distribute the first instruction to a first subset of the vector lanes; and
distribute the second instruction to a second subset of the vector lanes, the second subset of the vector lanes to execute the second instruction in parallel with the execution of the second instruction by the first subset of the vector lanes.

11. The system of claim 10, wherein the software application is to:
define the first subset of the vector lanes and the second subset of the vector lanes; and
provide the definitions to the VPU before providing the first instruction or the second instruction.

12. The system of claim 11, wherein:
the software application includes a compiler to assign the first instruction to a first set of vector registers in memory;
the first subset of the vector lanes accesses the first set of vector registers to execute the first instruction; and
the first set of vector registers are stored separately from one another in the memory.

13. The system of claim 12, wherein:
the first instruction is part of a first hardware thread executed by the first subset of the vector lanes; and
the second instruction is part of a second hardware thread executed by the second subset of the vector lanes.

14. The system of claim 13, including an operating system to:
define the first subset of the vector lanes based on an amount of parallelism in the first hardware thread;
define the second subset of the vector lanes based on an amount of parallelism in the second hardware thread; and
provide the definitions to the VPU before forwarding the first instruction or the second instruction to the VPU.

15. The system of any one of claim 13, including an operating system, wherein:
the operating system is to provide context instructions that describe whether to distribute the first instruction to the first subset of the vector lanes or to the second subset of the vector lanes; and
the operating system is privileged to generate the context instructions; and
the software application is not privileged to generate the context instructions.

16. The system of claim 15, including a scalar processing unit (SPU), wherein:
the context instructions are second context instructions; and
the operating system is to provide the second context instructions to the VPU in response to providing first context instructions to the SPU.

17. A system comprising:
a first operating system to generate a first instruction having a first length;
a second operating system to generate a second instruction having a second length;
a hypervisor to provide the first instruction and the second instruction to a vector processing unit (VPU); and
the VPU including:
a plurality of vector lanes, the vector lanes to collectively process a third instruction of a third length that is longer than the first length and the second length; and
sequencer circuitry to:
distribute the first instruction to a first subset of the vector lanes; and
distribute the second instruction to a second subset of the vector lanes, the second subset of the vector lanes to execute the second instruction in parallel with the execution of the second instruction by the first subset of the vector lanes.

18. The system of claim 17, wherein:
the first instruction is associated with a first virtual execution environment (VEE) executed by the first subset of the vector lanes, the first VEE corresponding to the first operating system; and
the second instruction is associated of a second VEE executed by the second subset of the vector lanes, the second VEE corresponding to the second operating system.

19. The system of claim 18, wherein the hypervisor is to:
define the first subset of the vector lanes based on an amount of parallelism associated with the first VEE;
define the second subset of the vector lanes based on an amount of parallelism associated with the second VEE; and
provide the definitions to the VPU before forwarding the first instruction or the second instruction to the VPU.

20. The system of claim 19, wherein:
the hypervisor is to provide context instructions that describe whether to distribute the first instruction to the first subset of the vector lanes or the second subset of the vector lanes; and
the hypervisor is privileged to generate the context instructions; and
the first operating system and the second operating system are not privileged to generate the context instructions.

* * * * *